United States Patent [19]
Wilhelm et al.

[11] Patent Number: 5,274,894
[45] Date of Patent: Jan. 4, 1994

[54] MACHINE FOR THE AUTOMATIC DRAWING-IN OF WARP THREADS

[75] Inventors: Hans Wilhelm, Chur; Karl Schlegel, Oberschan, both of Switzerland

[73] Assignee: Zellweger Uster AG, Uster, Switzerland

[21] Appl. No.: 739,475

[22] Filed: Aug. 2, 1991

Related U.S. Application Data

[63] Continuation-in-part of PCT/CH90/00227, Sep. 26, 1990.

[30] Foreign Application Priority Data

Oct. 4, 1989 [CH] Switzerland ................ 3633/89

[51] Int. Cl.⁵ ............................................. D03J 1/14
[52] U.S. Cl. .................................. 28/202; 28/203.1; 28/208
[58] Field of Search ............... 28/201, 202, 203.1, 28/204, 205, 206, 207, 208

[56] References Cited

U.S. PATENT DOCUMENTS

| | | | |
|---|---|---|---|
| 3,867,745 | 2/1975 | Crandall et al. | 28/207 |
| 4,223,716 | 11/1980 | Patel | 28/207 |
| 4,545,099 | 10/1985 | Tovenrath | 28/203.1 |
| 4,748,568 | 5/1988 | Tobler | 28/204 |
| 4,943,927 | 7/1990 | Reid | 139/1 R |
| 5,111,560 | 5/1992 | Sato | 28/203.1 |

FOREIGN PATENT DOCUMENTS

| | | |
|---|---|---|
| 0302364 | 2/1989 | European Pat. Off. |
| 0328680 | 8/1989 | European Pat. Off. |
| 1593584 | 6/1970 | France |
| 3-235556 | 9/1988 | Japan ........ 28/201 |
| 3-235557 | 9/1988 | Japan ........ 28/201 |
| 3-249744 | 10/1988 | Japan ........ 28/201 |

OTHER PUBLICATIONS

European Patent Office Search Report on PCT/CH 90/00227.

*Primary Examiner*—Clifford D. Crowder
*Assistant Examiner*—Larry D. Worrell, Jr.
*Attorney, Agent, or Firm*—Burns, Doane, Swecker & Mathis

[57] ABSTRACT

An automatic drawing-in machine separates warp yarn ends from one another and presents a separated end portion to a pick-up location in alignment with harness components such as a heald and/or a drop wire and/or a reed gap which have themselves been brought to their intended drawing-in positions by different, separately operated systems. Then a drawing-in member engages the yarn end and pulls it through the designed harness component(s). The drawing-in machine (SE) contains a drawing-in member, an arrangement for manipulating the individual harness elements, and a control stage (SM) for controlling the various functions of the drawing-in machine. The latter is composed of modules (PM, SM, XM, AM) for the various functions. The individual modules forming functional, independent units and being connected to one another via interfaces. The modules are controlled by a higher-level computer of the control stage (SM), via which the cross connections between the individual modules also run. The module autonomy enables increased redundancy of individual functions and enables them to be activated individually. In effect, the individual functions depend on one another only to a very small degree and faults are simple to localize.

12 Claims, 14 Drawing Sheets

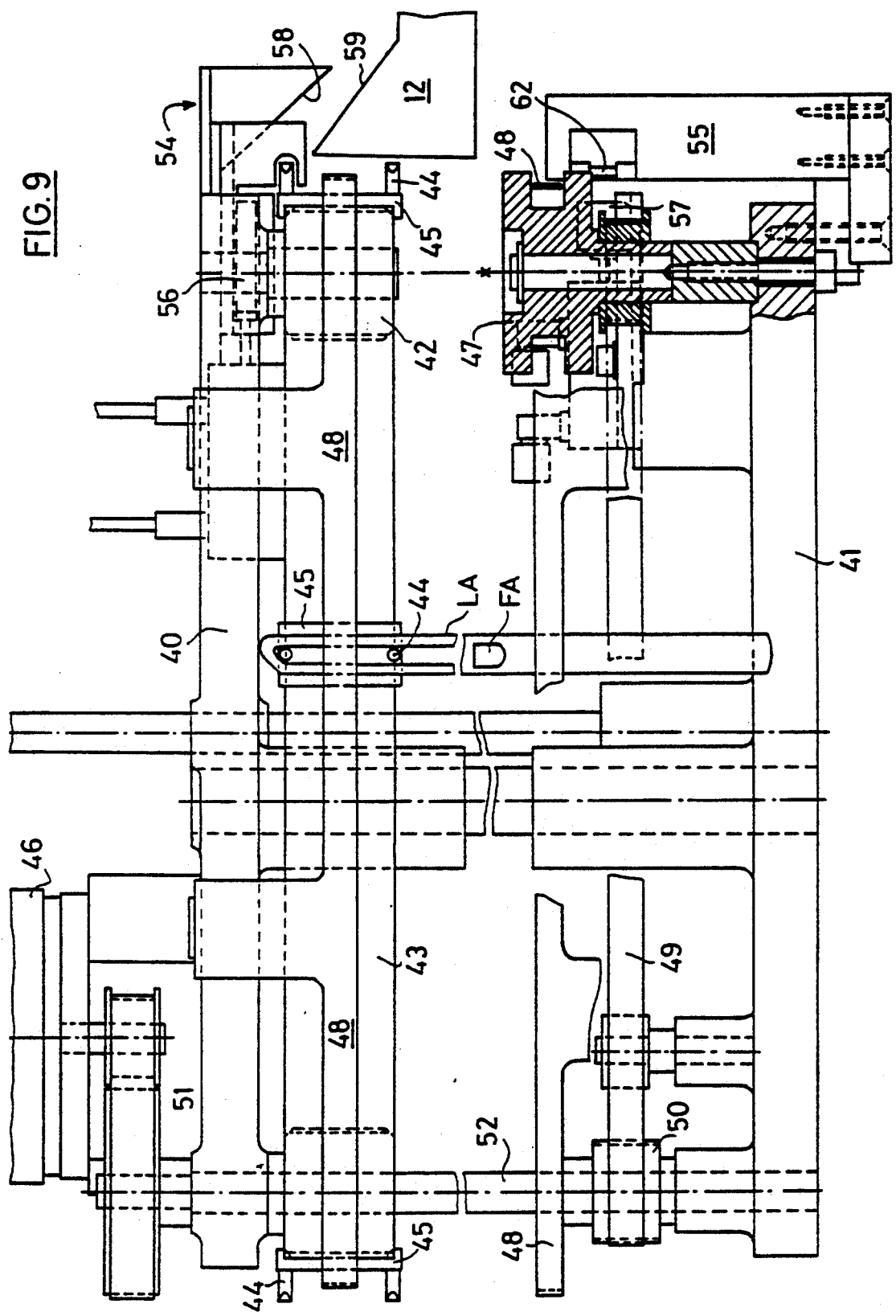

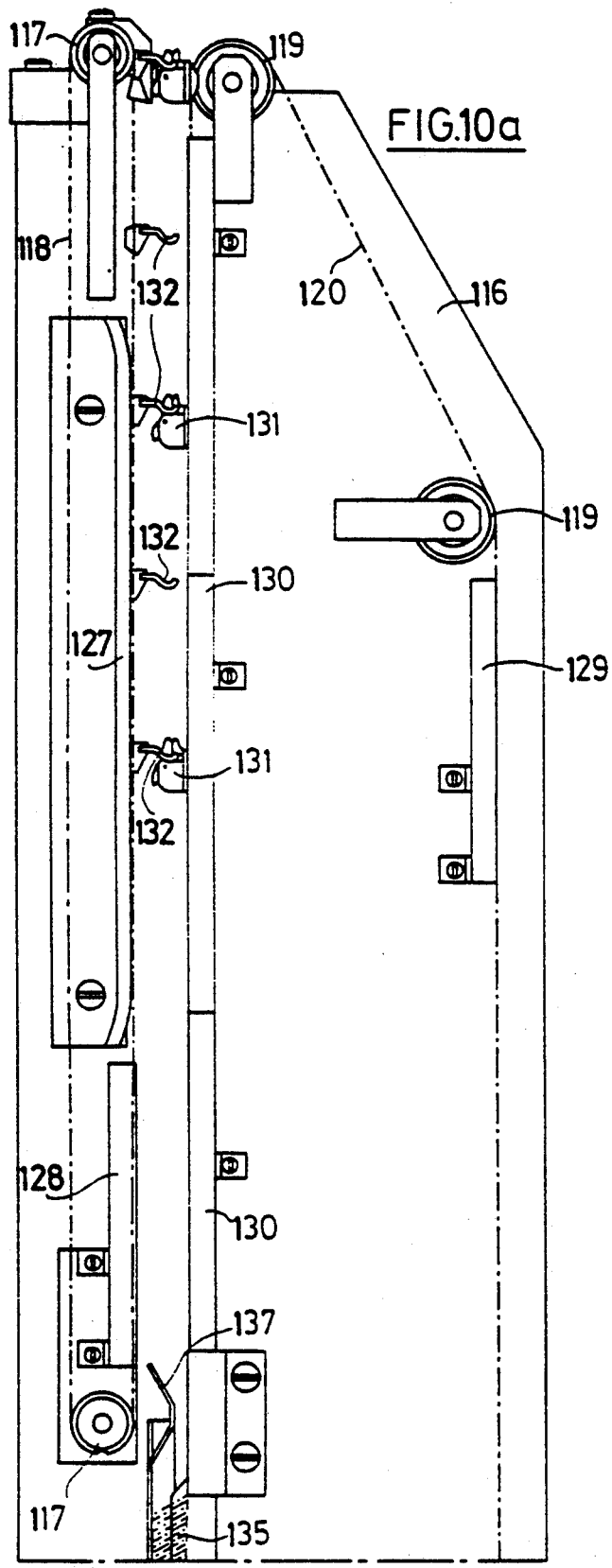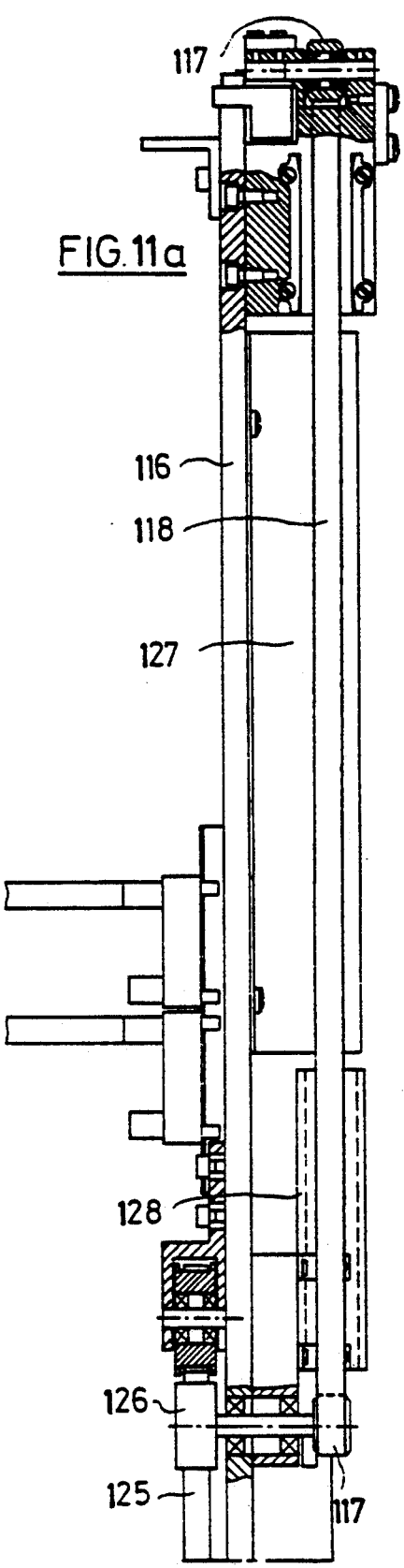

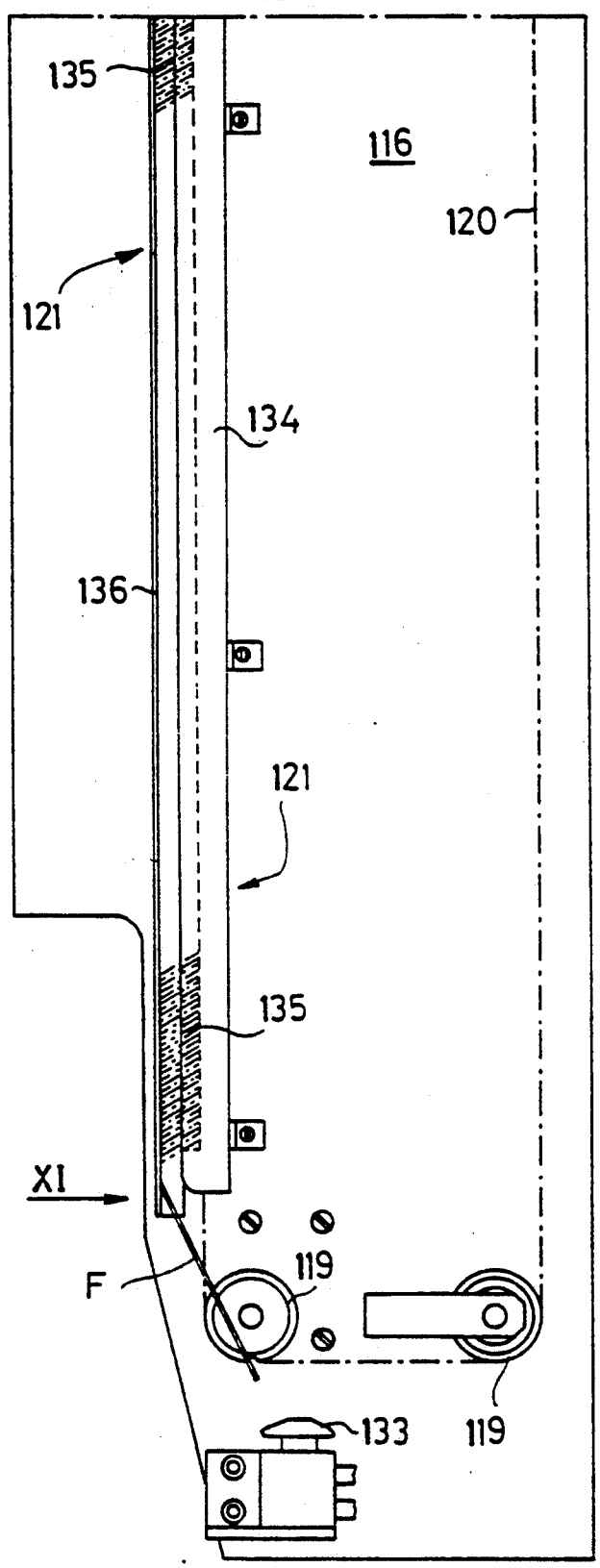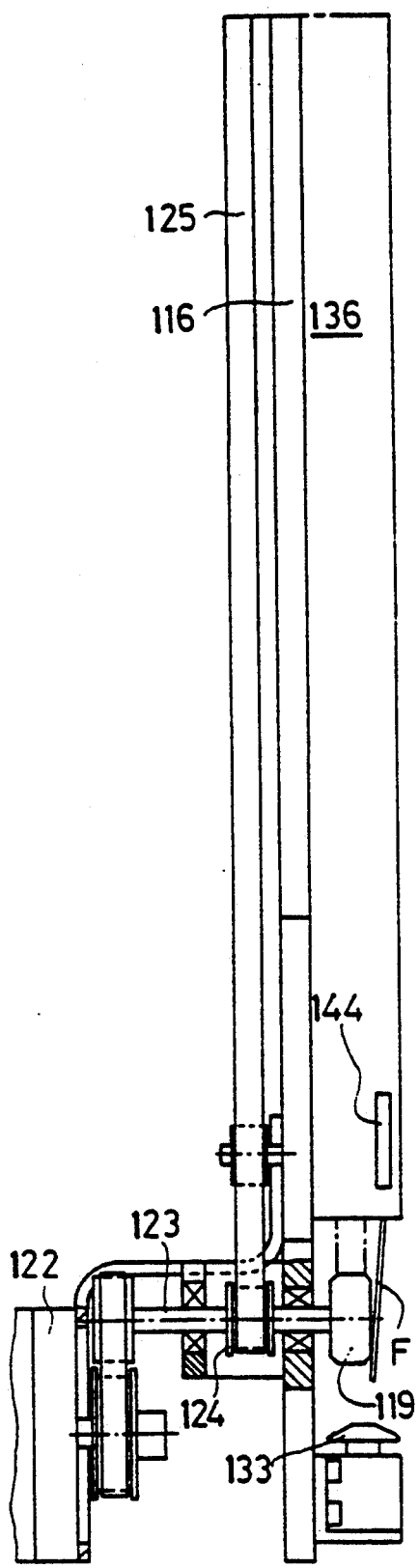

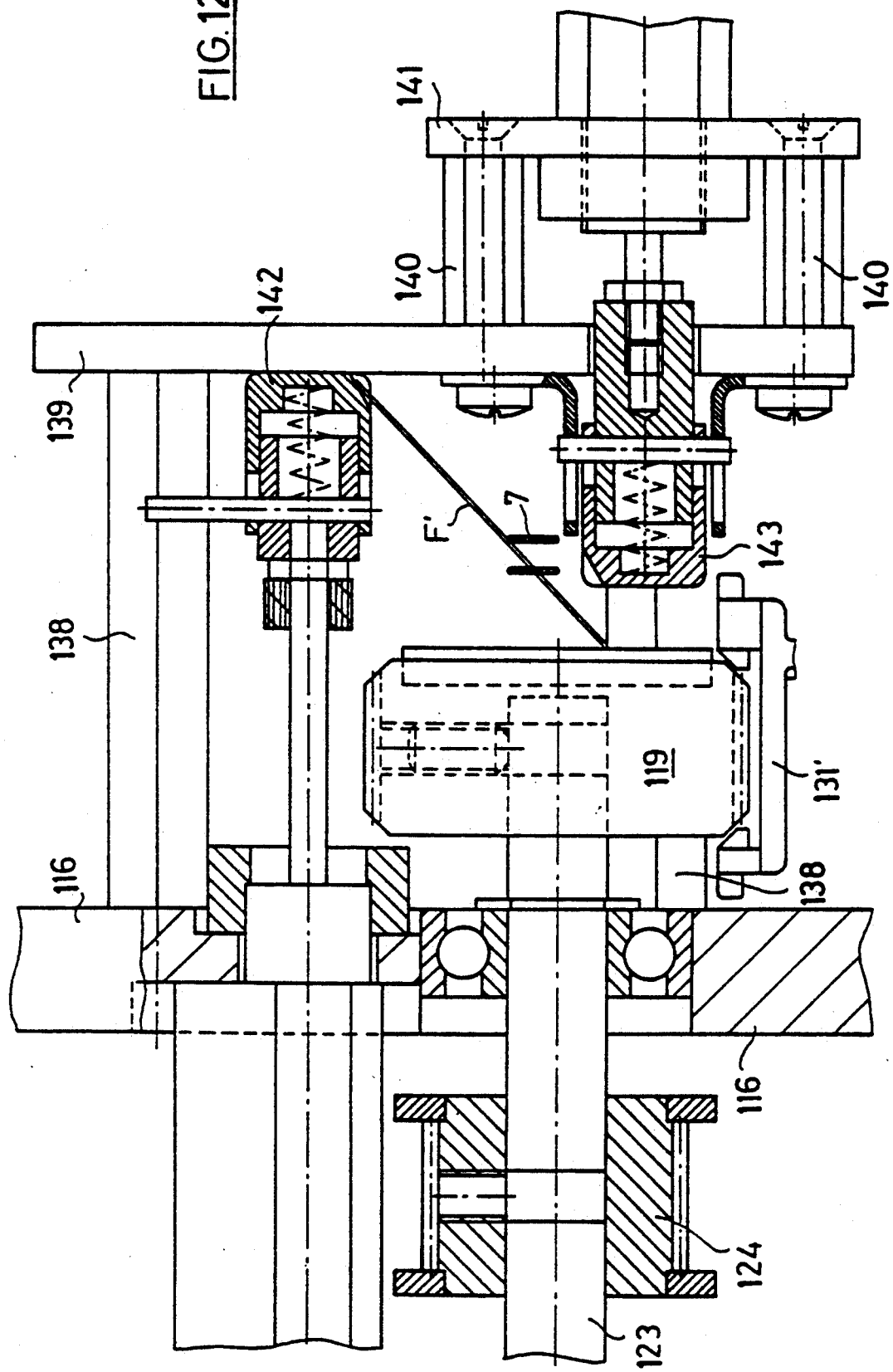

MACHINE FOR THE AUTOMATIC DRAWING-IN OF WARP THREADS

This application is a continuation-in-part of presently pending International Application No. PCT/CH 90/00227 filed Sep. 26, 1990.

FIELD OF THE INVENTION

The invention relates to a machine for the automatic drawing-in of warp yarns into corresponding elements of a weaving machine. It is concerned with apparatus which includes a drawing-in member, means for manipulating the weaving machine elements which are to be threaded with the warp yarns, and a control system for controlling the various functions.

BACKGROUND OF THE INVENTION

In a warp-thread drawing-in machine disclosed in U.S. Pat. No. 3,681,825 and GB-A-1,290,385, the individual functions are controlled and therefore positively interlinked via mechanical members such as lifters, plate cams and the like. Individual functional steps cannot be performed autonomously and independently of the other functional steps. Instead, a cycle comprising all functions always occurs. The result of this is that faulty operations of individual functional stages cannot be repeated and thus automatically corrected. Such faulty operations either have to be tolerated or repairs must be made manually during a machine stoppage.

If, for example, an individual heald is not correctly separated from a supply stack of healds, the separating operation cannot be repeated two or three times, since during this process the drawing-in member would of course perform a corresponding number of drawing-in operations and the reed would be transported further by a corresponding number of teeth. But separating faults of this type repeatedly occur in practice and thus lead to a reduction in productivity.

SUMMARY OF THE INVENTION

It is an object of this invention to provide a drawing-in machine which does not have this disadvantage, so that specific interventions in the sequence of the individual functional stages are possible without corresponding sequences automatically being initiated in other functional stages.

In accordance with an aspect of the invention, the drawing-in machine is composed of modules for the various functions; the individual modules are provided with their own module computers, form functional independent units, and are connected to one another via interfaces; and the several modules are controlled by a "higher-level" computer superposed to and in overriding relation to the several module computers, the cross connections between the individual modules running via this higher-level computer.

The individual functional stages are thus formed by autonomous modules, each of which represents virtually an independent machine. Since these autonomous modules communicate with one another only via the higher-level computer, it is no problem to allow isolated processes to run in the modules when required, which processes are restricted to the respective module and have no effects on other modules. Thus, for example, if a heald has not been correctly separated, the appropriate operation can be repeated several times, the rest of the machine being as it were at a standstill during this time and continues to run normally again only after the successful separating attempt. A further advantage is that the modular construction of the drawing-in machine enables it to be tailor-made to the individual customer's needs.

BRIEF DESCRIPTION OF THE DRAWINGS

The invention is described in greater detail below with reference to an exemplary embodiment and the drawings, in which:

FIG. 9 is a view in the direction of arrow IX in FIG. 8;

FIGS. 10$a$ and 10$b$ are elevation views of the leading and trailing portions of a thread-presenting device in the drawing-in machine;

FIGS. 11$a$ and 11$b$ are corresponding views at right angles to FIGS. 10$a$ and 10$b$;

FIG. 12 shows a detail of FIG. 11$b$;

DETAILED DESCRIPTION OF PREFERRED EMBODIMENT

Figure 1:
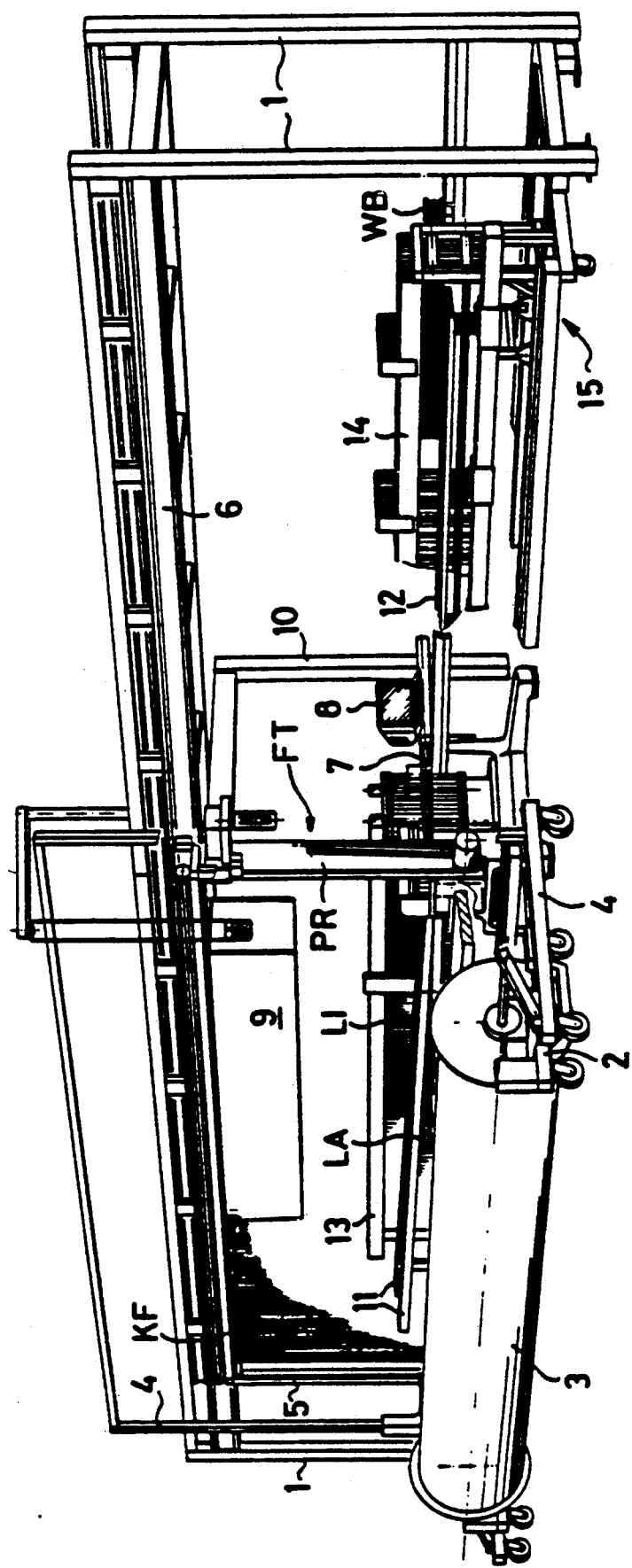
FIG. 1 is a perspective overall representation of a drawing-in machine according to the invention.

According to FIG. 1, the drawing-in machine includes a mounting stand 1 and various subassemblies arranged in this mounting stand 1. Each of these subassemblies represents a functional module. A warp-beam truck 2 with a warp beam 3 arranged thereon can be recognized in front of the mounting stand 1. The warp-beam truck 2 is connected to a so-called lifting device 4 for holding a frame 5, on which the warp threads KF are clamped. This clamping is effected before the actual drawing-in and at a location separate from the drawing-in machine, the frame 5 being positioned at the bottom end of the lifting device 4 directly next to the warp beam 3. For the drawing-in, the warp-beam truck 2 together with warp beam 3 and lifting device 4 is moved to the so-called setting-up side of the drawing-in machine and the frame 5 is lifted upwards by the lifting device 4 and it then assumes the position shown. The frame 5 is hung in a transport apparatus (not shown) mounted on a front longitudinal girder 6 of the mounting stand.

During the drawing-in process, the frame 5 and the lifting device 4 together with the warp beam truck 2 and the warp beam 3 are displaced from left to right in the longitudinal direction of the girder 6. During this displacement, the warp threads KF are directed past a thread-separating stage 6 which has an apparatus for selecting the warp threads and for cutting off the selected warp threads KF as well as an apparatus PR for presenting the cut-off warp threads to a drawing-in needle 7, which forms a component of the so-called drawing-in module. The selecting device used in the warp tying machine USTER TOPMATIC (USTER—registered trademark of Zellweger Uster AG) can be used, for example, for the selection of the warp threads.

Next to the drawing-in needle 7 there is a video display unit 8, which belongs to an operating station and serves to display machine functions and machine malfunctions and to input data. The operating station, which forms part of a so-called programming module, also contains an input stage for the manual input of certain functions, such as, for example, creep motion, start/stop, repetition of operations, and the like. The drawing-in machine is controlled by a control module which contains a control computer and is arranged in a control box 9. Apart from the control computer, this control box contains a module computer for every so-called main module, the individual module computers being controlled and monitored by the control computer. The main modules of the drawing-in machine, apart from the modules already mentioned (drawing-in module, yarn module, control module and programming module), are the heald module, the drop-wire module, and the reed module.

The thread-separating stage FT, which presents the warp threads KF to be drawn in to the drawing-in needle 7, and the path of movement of the drawing-in needle 7, which runs vertically to the plane of the clamped warp threads KF, define a plane in the area of a support 10 forming part of the mounting stand 1, which plane separates the setting-up side already mentioned from the so-called taking-down side of the drawing-in machine. The warp threads and the individual elements into which the warp threads are to be drawn in are fed at the setting-up side, and the so-called harness (healds, drop wires and reed) together with the drawn-in warp threads can be removed at the taking-down side. During the drawing-in, frame 5 having the warp threads KF and the warp beam truck 2 having the warp beam 3 are moved to the right past the thread-separating stage FT, in the course of which the drawing-in needle 7 successively removes from the frame 5 the warp threads KF clamped on the latter.

When all warp threads KF are drawn in and the frame 5 is empty, the latter (together with the warp-beam truck 2, the warp beam 3 and the lifting device 4) is located on the taking-down side.

Arranged directly behind the plane of the warp threads KF are the warp-stop-motion drop wires LA. Behind the latter are the healds LI and further to the rear is the reed. The drop wires LA are stacked in hand magazines and the full hand magazines are hung in sloping feed rails 11, on which they are transported to the right towards the drawing-in needle 7 where they are separated and moved into the drawing-in position. Once drawing-in is complete, the drop wires LA pass on to drop-wire supporting rails 12 on the taking-down side.

The healds LI are lined up on rails 13 and shifted on the latter to a separating stage. The healds LI are then moved individually into their drawing-in position and, once drawing-in is complete, are distributed over the corresponding heald shafts 14 on the taking-down side. The reed is likewise moved step-by-step past the drawing-in needle 7, the corresponding reed gap being opened for the drawing-in. After the drawing-in, the reed is likewise located on the taking-down side. A part of the reed WB can be recognized to the right next to the heald shafts 14. This representation is to be understood purely as an illustration, since the reed, at the position shown of the frame 5, is of course located on the setting-up side.

As further apparent from FIG. 1, a so-called harness truck 15 is provided on the taking-down side. This harness truck 15, (together with the drop-wire supporting rails 2 fixed thereon, heald shafts 14 and a holder for the reed) is pushed into the mounting stand 1 into the position shown and, after the drawing-in, carries the harness having the drawn-in warp threads KF. At this moment, the warp-beam truck 2 together with the warp-beam 3 is located directly in front of the harness truck 15. By means of the lifting device 4, the harness is now reloaded from the harness truck 15 into the warp-beam truck 2, which then carries the warp beam 3 and the drawn-in harness and can be moved to the relevant weaving machine or into an intermediate store.

The various functions are distributed over a plurality of modules which represent virtually autonomous machines controlled by a common control computer. The cross connections between the individual modules run via this higher-level control computer, and there are no direct cross connections between the individual modules. If the structure of the drawing-in machine described is considered, the drawing-in machine system receives drawing-in data, control data, harness and yarn as well as energy and delivers processed operating data, status information and the drawn-in harness.

Figure 2:
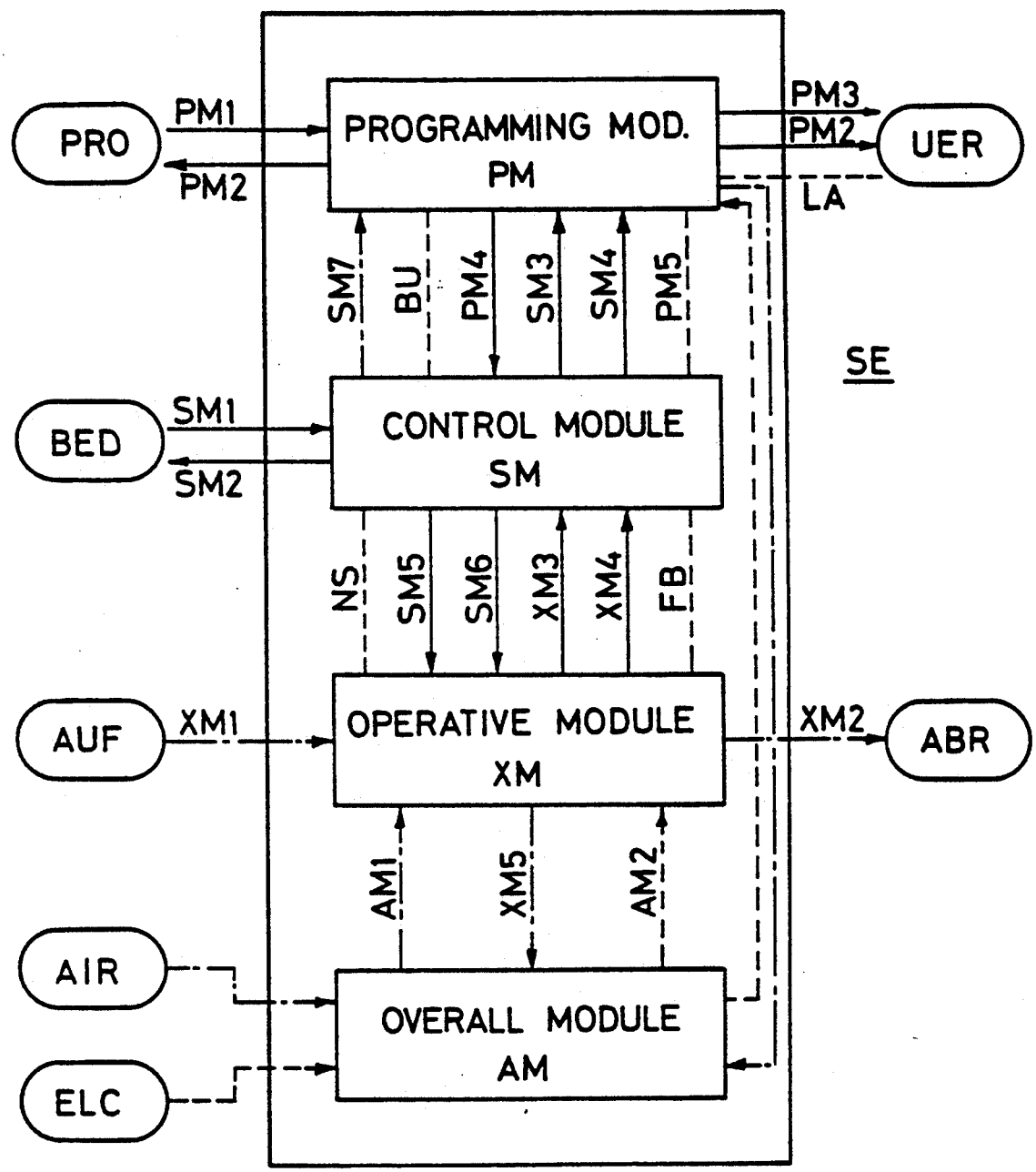
FIG. 2 is a functional schematic of the drawing-in machine in FIG. 1.

This construction with the system and module interfaces is shown schematically in FIG. 2. According to the representation, the drawing-in machine, designated by SE, contains the programming module PM, the control module SM, a so-called overall system module AM and at least one working module XM, which represents one of the modules already mentioned—yarn module, drop-wire module, heald module, reed module and draw-in module. If there are a plurality of these modules, a corresponding number of working modules XM are to be provided and arranged in parallel. In FIG. 2, three types of connections are symbolized, and in fact a solid line designates a software connection, a dash line a hardware connection and a chain line a mechanical connection.

The programming module PM has a programming interface PRO and an interface UER leading to a higher-level computer. The programming interface PRO delivers draw-in data PMI to the programming module PM and receives from the latter status information PM2. The programming module PM delivers processed operating data PM3 and likewise status information PM2 to the higher-level computer UER. In addition, there is a hardware connection LA, formed via a LAN (=Local Area Network), between programming module and higher-level computer.

The functions of the programming module are as follows: Operator guidance for program preparation and machine operation, data communication with the control computer (control module SM), data management, processing of raw scan data from the generation of scan data, display of machine malfunctions and communication with higher-level systems.

The control module SM has an operator interface BED from which it receives control data SM1 and to which it delivers status information SM2. According to the representation, the control module SM is also connected to the programming module PM and to the working module or working modules XM. The control module SM delivers raw operating data SM3 and raw status information SM4 to the programming module PM, and module inputs SM5 and module commands SM6 to the working module KM.

The control module SM receives processed draw-in data PM4 and stabilized electricity PM5 from the programming module PM. In addition, there is a fastening connection SM7 and an AT bus connection BU between these two modules. The control module SM receives the module status XM3 and the module enquiry data XM4 from the working module (from each working module) XM. Hardware connections between working module XM and control module SM are emergency stop NS and field bus FB.

As already mentioned, the control module SM contains a higher-level control computer which controls and monitors the computers of the individual working modules in real-time operation. Each of the said working modules XM contains a separate module computer. The monitoring function is utilized for the generation of scan data and for transmitting to the higher-level computer UER.

The overall system module AM serves to perform static auxiliary functions, in particular holding and fastening functions, and has two interfaces ELC and AIR for supplying the drawing-in machine SE with electric and pneumatic energy. Electric energy and air are processed by the overall system module AM and transmitted to the programming module PM (only processed electricity) and the working module XM (processed electricity and processed air).

The working module XM has a set-up interface AUF and a take-down interface ABR. It receives harness and yarn XM1 from the set-up interface AUF and delivers the drawn-in harness XM2 to the take-down interface ABR. Apart from these connections and those to the control module SM, there are three connections to the overall system module AM via which the working module XM obtains processed air and processed electricity respectively. These three connections are a fastening connection XM5 and two connections AM1 and AM2.

As already mentioned, the working module XM represents one or more of the following modules: Yarn module, draw-in module, heald module, drop-wire module, reed module. These modules themselves are split up into submodules which are specified below together with their functions.

The yarn module assumes all manipulating functions with the warp beam and the warp thread layer and has the following submodules:

Manipulating the warp bean: Transport along the machine and removal, permitting taking-over of the thread layer by the next submodule "presentation of the thread layer, and permitting the take-down.

Presentation of the thread layer: taking-over of "manipulating the warp beam" and transport to "yarn separation".

Yarn separation: Separating the warp threads and passing on to "yarn presentation'.

Yarn presentation: Taking over the threads from "yarn separation", transport of the thread ends in draw-in position and presentation to draw-in module, holding the thread before draw-in and during draw-in a defined status.

The draw-in module takes over the threads from the "yarn presentation, and draws in each thread through a drop wire, a heald and a reed gap. In addition, it ensured that the drawn-in thread is removed from the draw-in mechanism before the next draw-in.

The heald module processes the healds from the magazine stack up to the drawn-in heald on the shaft and consists of the following submodules:

Heald storing: Acceptance of the healds from stack by the user, intermediate storage of the heald stacks, passing on the heald stacks to the next submodule.

Splitting up the heald stacks: This submodule, which is only used if duplex healds arrive at the machine mixed on a stack, serves to sort heald stacks of this type into left-hand and right-hand healds.

Heald separation: Receiving the heald stack, separating the healds from the stack, passing on each heald to the submodule "heald positioning".

Heald positioning: Taking over the heald from the submodule "heald separation", transport of the heald to the draw-in position, positioning of the heald laterally and vertically, transport of the heald with the drawn-in warp thread to the predetermined shaft position, transfer of the heald to the respective shaft.

Holding the shafts: Holding the shafts during the drawing-in to permit the transfer of the healds from the "heald positioning" to the shafts, feeding the shafts and drop-wire supporting rails before and removal after the drawing-in (coupled with the submodule "manipulating the warp beam"), taking over the reed after the drawing-in for the take-down operation, permitting the take-down.

Heald conveyance: Conveyance of the drawn-in healds inside the shafts from the filling side to the other side, holding the heald supporting rails even in the case of closed end eyelets, permitting the set-up and take-down operation with the submodule "holding the shafts'.

The drop-wire module processes the drop wires from the magazine stack up to the drawn-in drop wire on the supporting rail. It consists of the following submodules:

Drop-wire storing: acceptance of the drop wires from the stack by the user, intermediate storage of the drop-wire stacks, if need be passing on the drop-wire stacks to the next submodule "drop-wire separation".

Drop-wire separation: Receiving the drop-wire stacks, separating each drop wire from the stack, passing on the drop wire to the submodule "drop-wire distribution".

Drop-wire distribution: Taking over the drop wire from the submodule "drop-wire separation", transport of the drop wire to and positioning it in the draw-in position, transport of the drop wire with the drawn-in thread to a certain position of the supporting rail, transfer of the drop wire to the submodule "drop-wire conveyance".

Drop-wire conveyance: Distribution of the drawn-in drop wires over the entire length of the supporting rail, holding the drop-wire supporting rail for permitting general drop-wire transport over the entire length of the supporting rail, permitting the set-up and take-down operation with the submodule "holding the shafts".

The reed module is responsible for manipulating the reed and ensures that the drawn-in threads can no longer slip back. It consists of the following submodules:

Reed presentation: Moving the reed into the desired position, presentation of the reed gap in the drawing-in position, permitting the draw-in with the draw-in module.

Yarn fixing: Taking over the yarn from the draw-in module and fixing the yarn once drawing-in is complete, further transport of the drawn-in thread layer.

Figure 3:
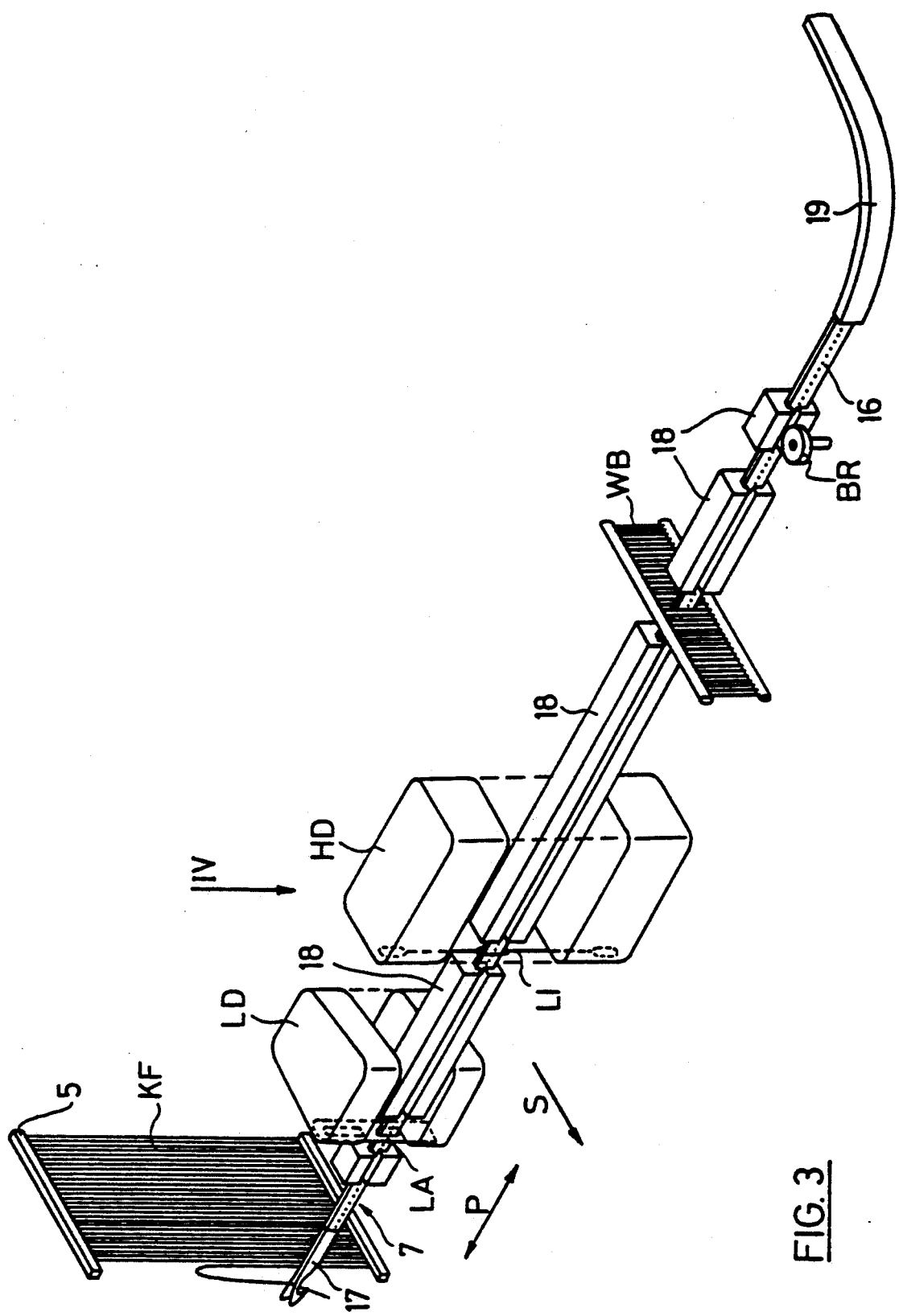
FIG. 3 is a perspective representation of the drawing-in module.

The most important modules and submodules will now be described with reference to FIGS. 3 to 14: FIG. 3 shows the "draw-in" module, FIGS. 4 to 7 show the submodule "heald positioning", FIGS. 8 and 9 show the submodule "drop-wire distribution" and FIGS. 10 to 14 show the submodule "yarn presentation." These and other modules and submodules are disclosed in the following co-pending applications of the owner (Zellweger Uster AG) of this application and their disclosures are incorporated herein by reference in their entireties. The "draw-in" module is disclosed in International Application PCT/CH90/00283, the submodule "presentation of the thread layer" in U.S. application Ser. No. 07/862,764 corresponding to Swiss Application 3 384/90, the submodule "heald separation" in U.S. application Ser. No. 07/665,155, U.S. Pat. No. 5,184,380, the submodule "drop-wire storing" in U.S. application Ser. No. 07/702,020, U.S. Pat. No. 5,148,585 the submodule "drop-wire separation" in U.S. application Ser. No. 07/747,345 corresponding to Swiss Application 2699/90, the submodules "drop-wire distribution/heald positioning" in U.S. application Ser. No. 07/856,031 corresponding to Swiss Application 03 000/90-0, the submodule "drop-wire conveyance" in U.S. application Ser. No. 07/822,908 corresponding to Swiss application 0181/91, and the submodule "reed presentation" in U.S. application Ser. No. 07/836,886 corresponding to Swiss Application No. 0545/91.

As apparent from FIG. 3, the drawing-in needle 7, which forms the main component of the draw-in module, is formed by a gripper band 16 and a clamping gripper 17 carried by the same. The drawing-in needle 7 is guided in the lifting direction (arrow P) in a channel-like guide 18 which extends from the frame 5 in a rectilinear direction up to a curved end part 19. The guide 18 passes through the drawing-in machine and is in each case interrupted in the area of the harness members (drop wires LA, healds LI) and the reed WB in order to permit the feed of the harness members to the drawing-in position and their further transport after drawing-in is complete up to the transfer (arrow S) to drop-wire supporting rails 12 and to the heald shafts 14 (FIG. 1) or the drawing-in of the warp threads into the reed WB. The gripper band is provided with feed holes at a uniform distance apart and is driven by a band wheel BR which has on its periphery lobe-shaped or stud-shaped projections engaging into the feed holes.

The feed of the drop wires IA and the healds LI to the drawing-in position and their further transport up to the transfer to the drop-wire supporting rails or to the heald shafts is effected by the submodule drop-wire distribution LD and by the submodule heald distribution HD. In the transport direction of the healds LI, the heald distribution submodule HD follows the submodule heald separation. In the transport direction of the drop wires LA, the drop-wire distribution submodule LD follows the submodule drop-wire separation. Both submodules HD and LD perform equal functions in principle by accepting healds or drop wires presented to them sequentially, and by transporting them further after the drawing-in of the warp threads is complete to a transfer station, where transfer to the heald shafts or drop-wire supporting rails is effected.

As can be gathered from the above mentioned U.S. application Ser. No. 07/665,155, now U.S. Pat. No. 5,184,380, the frontmost heald LI, lying directly in front of the submodule HD, of a heald stack is in each case moved by a piston-like selecting member out of the heald stack into an intermediate position and is pushed from this position by a plunger into needle-like holdings means. The latter form a component of the heald distribution submodule HD. According to U.S. application Ser. No. 07/742,345 corresponding to Swiss Application 2699/90, the drop wires LA pushed up slightly from their stack by a friction roller so that their head end projects freely upwards. In this position, a hook mounted on a conveyor belt grips the drop wires and pulls them completely out of the stack into a transfer station. In the latter, the suspended drop wire is blown by compressed air onto corresponding holding means which form a component of the drop-wire distribution submodule LD.

Figure 4:
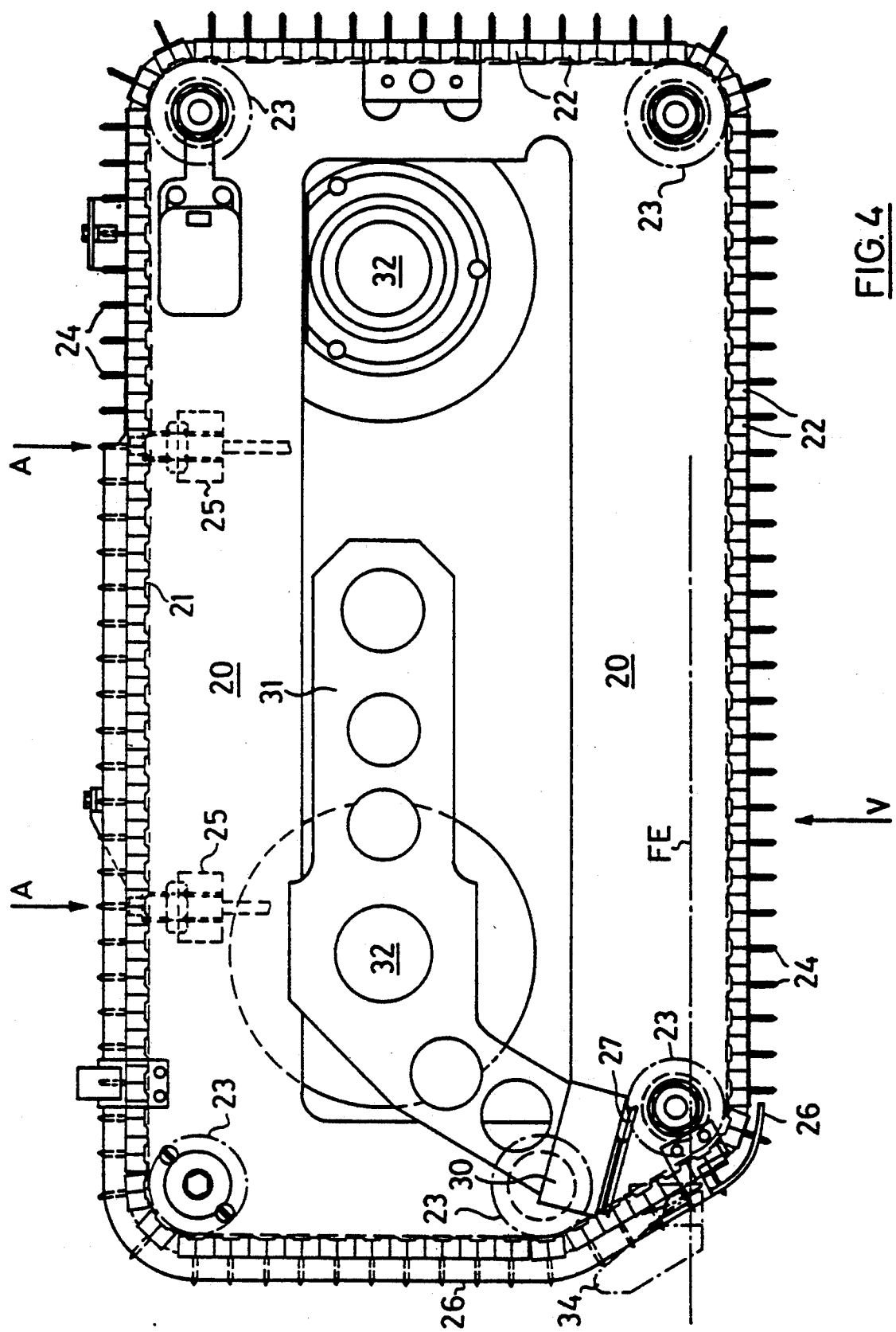
FIG. 4 is a plan view of a device for manipulating healds in the direction of arrow IV in FIG. 3.
Figure 5:
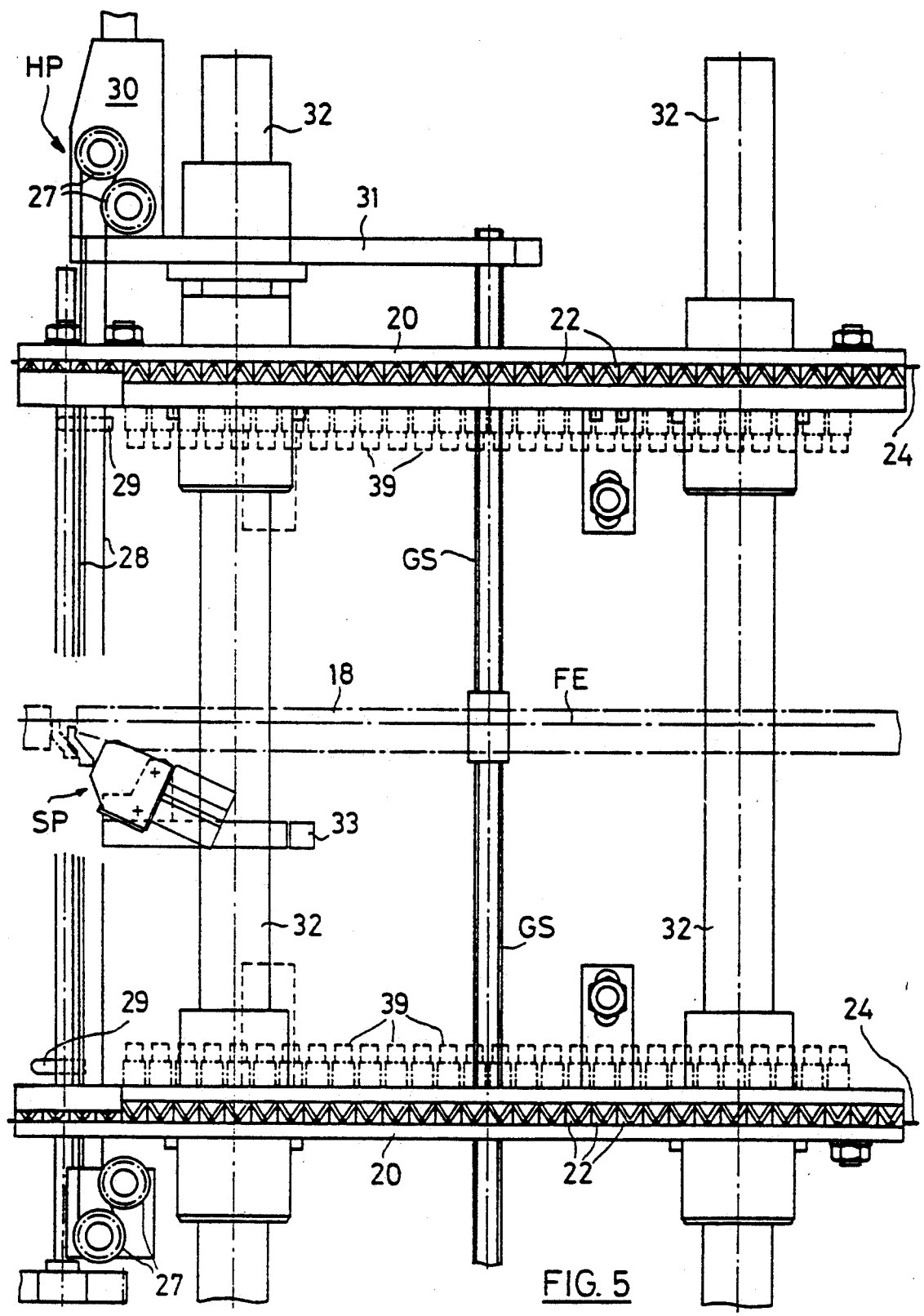
FIG. 5 is a view in the direction of arrow V in the FIG. 4.
Figure 6:
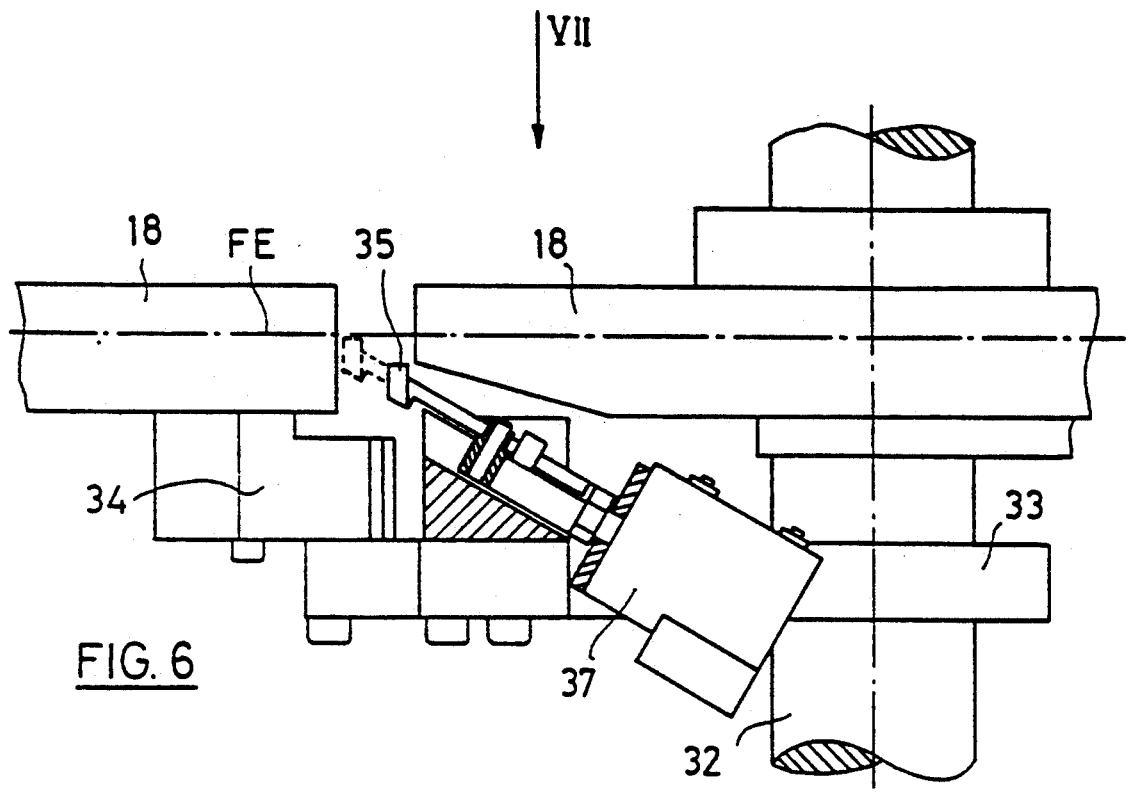
FIG. 6 is a detail of FIG. 5 to an enlarged scale.
Figure 7:
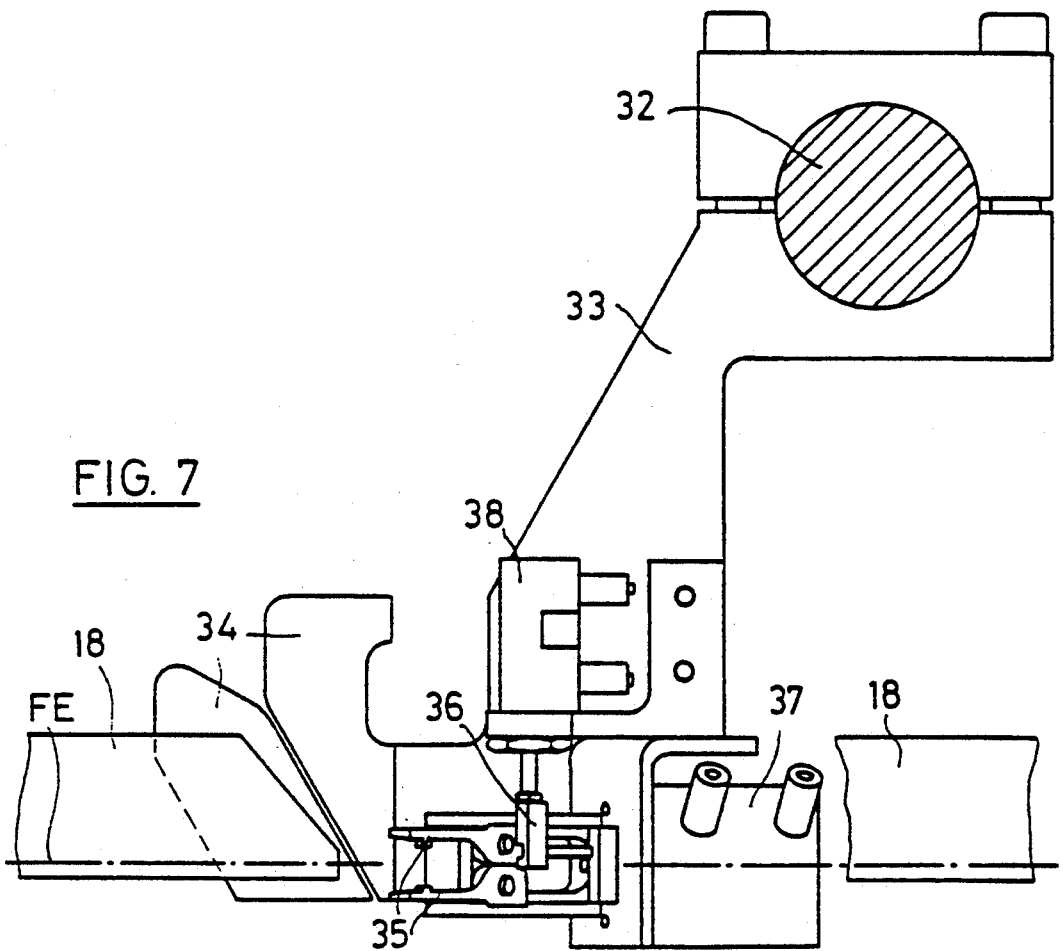
FIG. 7 is a view in the direction of arrow VII in FIG. 5.
Figure 8:
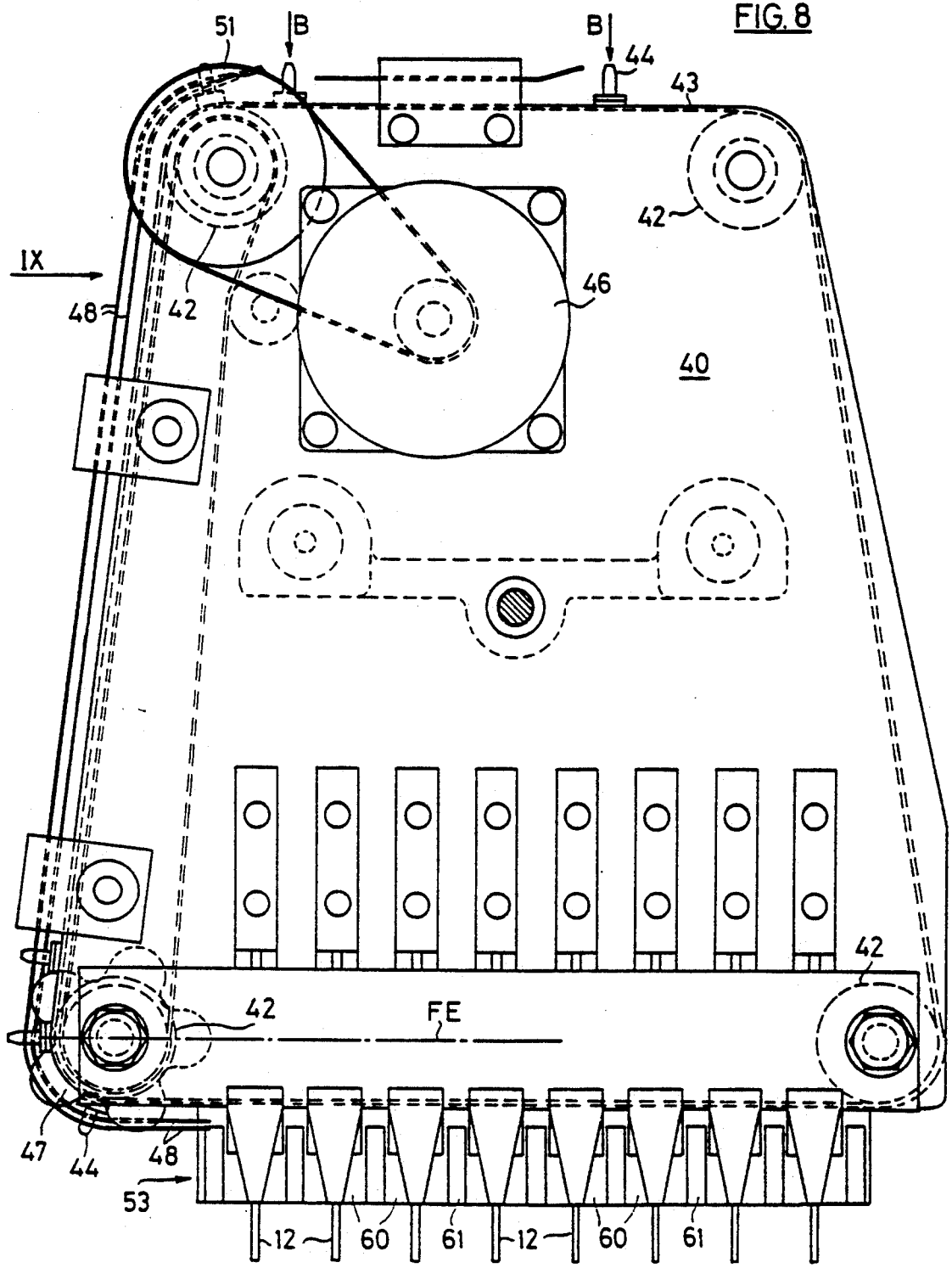
FIG. 8 is a plan view of a device for manipulating drop wires.

The heald distribution submodule HD is shown in FIGS. 4 to 7. FIG. 4 shows a plan view to a scale of about 1:2.5, FIG. 5 shows a side view and FIGS. 6 and 7 show a detail.

According to the representation, the heald distribution submodule HD essentially comprises two components: transport planes formed by appropriate planes 20, in each of which an endless transport means provided with heald holders is guided. This transport means is designed like a band, belt or chain. A chain is preferably used as transport means, which chain consists of individual links 22 carried by a toothed belt 21. The toothed belt 21 is provided with a tooth system on either side; the tooth system on the inside meshes with corresponding guide rollers 23, of which at least one is motor-driven. The tooth system on the outside of the toothed belt 21 centers the chain links.

On its side remote from the toothed belt 21, each of the chain links 22 has a projecting V-shaped rib. To the apex of this rib a pin being designed as heald holder is anchored. The healds are slipped with their end hooks onto the pins 24; the mutual vertical distance apart of the pins 24 and thus of the plate 20 can be adjusted for adaptation to the length of the healds to be processed. Used for this purpose is a threaded spindle GS which meshes with thread locks mounted on the plates 20 of the transport planes.

The healds are transferred to the heald distribution module HD at the locations designated by arrows A, the two arrows symbolizing the fact that the separation of the healds and their transfer takes place in two channels, although this is not absolutely necessary. Sensors 25 for monitoring the heald acceptance are present at the acceptance locations. After acceptance, the healds are transported to the thread drawing-in position by the chain 21, 22 rotating anti-clockwise and driven intermittently by a stepping motor.

Provided between the acceptance point A and the thread drawing-in position is a guide rail 26 which prevents the healds from falling off the pins 24. In FIGS. 4 to 7 the thread drawing-in path is designated by a chain-dotted straight line FE; the thread drawing-in position of the healds is the point at which their path intersects the straight line FE.

In this area, the channel-like guide 18 (FIG. 3) has an interruption through which the healds cross the guide 18. Since the thread eyelet of the healds is relatively small, the healds must be positioned very accurately for the drawing-in of the thread. This precise positioning is effected vertically on the one hand, that is, the longitudinal direction of the healds, and laterally on the other hand, that is transversely to the longitudinal direction and transversely to the thread drawing-in path FE by corresponding positioning means HP and SP respectively. The vertical-positioning means HP apparent from FIG. 5 comprises an endless cable 28 which is guided via drive rollers 27 and to whose two sides one positioning pin 29 each is fastened. Upon actuation of the vertical-positioning means HP, these positioning pins shift up and down and press against the V-shaped ribs of the two chain links 22 carrying the heald to be positioned. The drive for the cable 28, which drive is formed by a pneumatic cylinder 30, and the top drive rollers 27 are mounted on a supporting arm 31, which in turn is carried by a support shaft 32 passing through the heald distribution module HD. A total of two support shafts 32 of this type are provided.

The lateral-positioning means SP apparent in particular from FIGS. 5 and 7 are mounted in the area of the channel-like guide 18 on a supporting means 33 likewise fastened to the support shaft 32 carrying the supporting arm 31 and comprise a cross guide 34 for the healds, a positioning lever 35 and a control stirrup 36. The cross guide 34, which is arranged just below the channel-like guide 18, has a funnel-like entry part and, following the entry part, a relatively narrow guide part in which the healds are guided fairly accurately with regard to their lateral displacement. The exact lateral positioning is effected by the positioning lever 35. This positioning lever 35 is designed as a two-piece gripper. It is driven by a pneumatic cylinder 37 and is moved at an angle from below towards the heald to be positioned. In its end position drawn in broken lines in FIG. 5, the positioning lever 35 is closed by the control stirrup 36 driven by a pneumatic cylinder 38, as a result of which the heald is firmly clamped and positioned for the drawing-in of the thread.

Following the drawing-in of the thread, the heald is released again from the positioning lever 35 so that it can leave the cross guide 34 and finally also the guide rail 26 and can be transferred to its heald supporting rail. This transfer is effected by pneumatically driven ejector cylinders 39 which are arranged in the area of the two plates 21 and can be selectively activated as a function of the distribution, predetermined by the pattern to be produced on the weaving machine, of the healds over the individual heald shafts, and in fact in each case the top and bottom ejector cylinder 39 of each heald can be activated in pairs. According to the representation, twenty-eight of each of the top and bottom ejector cylinders 39 are provided, so that the healds can be distributed over a maximum of twenty-eight shafts.

The drop-wire distribution module LD is shown in FIGS. 8 and 9, and in fact in FIG. 8 in a plan view in the direction of arrow IV in FIG. 3 to a scale of about 1:1.5 and in FIG. 9 in a side view in the direction of arrow IX in FIG. 8. The function of the drop-wire distribution module ID is very similar to that of the heald distribution module HD. The main differences between the two lie in the fact that the drop wires are shorter than the healds, that their thread eyelet is substantially larger than that of the healds so that the demands made on the positioning accuracy for the drawing-in are not so great, and that the number of drop wire supporting rails is substantially smaller than that of the heald supporting rails.

Just like the heald distribution module HD, the drop-wire distribution module LD contains as a basis two plates 40 and 41 which are at an adjustable mutual distance apart and serve as supporting means for the various transport and positioning means for the drop wires LA. Stretched on the top plate 40 via corresponding gearwheels 42 is an endless toothed belt 43, to the outside of which holding means for the drop wires LA are fastened. These holding means consist of a small plate 45 having two supporting pins 44 arranged vertically one below the other. The drop wires LA are suspended with their supporting slit on the supporting pins 44.

The drop wires are transferred to the holding means 44, 45 at locations designated by arrows B, the two arrows symbolizing two processing channels of the drop wire separation stage. The acceptance of drop wires by the drop-wire distribution module LD is monitored by sensors (not shown). After acceptance, the drop wires IA are transported by the toothed belt 43, moving anti-clockwise and driven intermittently by a stepping motor 46, to the thread drawing-in position, which lies in the area of a star-shaped positioning wheel 47 carried by the bottom plate 41. Between the acceptance location B up to directly after the thread drawing-in position, one guide rail 48 each for preventing the drop wires from falling off the supporting pins 44 is provided in the area of the two plates 40, 41.

The channel-like guide 18 (FIG. 2) passes through the drop-wire distribution module LD along the chain-dotted straight line FE (FIG. 8), marking the thread drawing-in path, at the level between the two plates 40 and 41. The thread drawing-in position is located at the point at which this straight line passes through the toothed belt 43 at the positioning wheel 47, which point is designated by an x in FIG. 9. The thread eyelet FA of the drop wire LA positioned by the supporting pins 44 and between the projections of the positioning wheel 47 is then in alignment with the straight line FE. In this area, the channel-like guide 18 (FIG. 3) has an interruption in which the drop wires LA cross the guide 18.

The positioning wheel 47 is likewise driven intermittently, and in fact via a toothed belt 49 and a gearwheel 50 which is fastened to the drive spindle 52 of the toothed belt 43 carrying the holding means 44, 45 for the drop wires IA, which drive spindle 52 is driven by the stepping motor 46 via a toothed-belt drive 51.

After the drawing-in of the thread in the area of the positioning wheel 47, the drop wires LA, now carrying one drawn-in warp thread each, pass into the area of a bank-like row 53 of transfer stations, of which, according to FIG. 8, a total of eight are provided in accordance with the number of eight possible drop-wire supporting rails 12 (FIG. 1). In the transfer stations, the drop wires LA are pushed according to program onto the corresponding drop-wire supporting rails 12.

According to the representation, the transfer stations consist of a top and a bottom substation 54 and 55, of which each is fastened to the corresponding plate 40 or 41. Both substations 54 and 55 each have a pneumatically driven ejector 56 and 57 respectively, upon actuation of which the relevant drop wire IA is pushed onto its supporting rail 12. The top substation 54 is designed in such a way that the drop wires, when being pushed down from the supporting pins 44, run with their topmost edge against a guide plane 58 sloping downwards and are thereby directed downwards so that they are positively guided onto an entry flank 59 (of corresponding sloping design) of the drop-wire supporting rails 12 and slide along from this entry flank 59 onto the horizontal part of the drop-wire supporting rail 12.

The bottom substation 55 contains a shaft-like chamber 60 which is open to the front, rear and top and is separated from the chamber of the adjacent stations by cross walls 61. Each chamber 60 is closed off from the toothed belt 43 and the ejector 57 by a flap 62 like a double swing door. This flap 62 serves as a safety device to prevent the drop wires LA from falling off the supporting pins 44 unintentionally as a result of the tension force of the drawn-in warp threads. When activated, the ejector 57 pushes open the flap 62 and as a result pushes the drop wire LA at its bottom part into the chamber 60. At the same time, the top ejector 56 pushes the drop wire from its supporting pins 44 towards the guide plane 58 and onto the entry flank 59 of the drop-wire supporting rails 12. The latter are held in the transfer position by distance plates displaceable in the longitudinal direction of the rails. When they are displaced along the drop-wire supporting rails 12, the distance plates transport the drop wires further. The drop-wire supporting rails 12 are held in the horizontal by retractable and extendable holding bolts fastened to a transport system. In their retracted position, these holding bolts position the drop-wire supporting rails 12; they are extended for passing the drop wires at the relevant location.

At their top plate 21 or 40, both the heald and the drop-wire distribution module HD and LD respectively are provided with corresponding covering hoods which on the one hand cover the entire mechanism and protect the same from being covered in dust and on the other hand have connections for the requisite pneumatic and electronic lines.

FIGS. 10 and 11 show the yarn presentation device which forms part of the thread separating stage FT (FIG. 1). This device is shown in side view in FIG. 10a and 10b, as seen from the left with regard to FIG. 1, and is shown in rear view in FIG. 11a and 11b in the direction of arrow XI in FIG. 10b. FIGS. 10a and 11a are each terminated at the bottom and FIGS. 10b and 11b are each terminated at the top by a dot-dash line and are to be imagined as being lined up at these terminating lines.

According to the representation, the presentation apparatus PR essentially comprises an elongated base plate 116 which is fastened to the mounting stand 1 (FIG. 1) and on which there are arranged first rollers 117 for guiding and driving a guide belt 118 extending from the top down to about the center of the base plate 116, second rollers 119 for guiding and driving a transport belt 120 extending over the entire length of the base plate 116, and a thread-holding device 121 which, following the guide belt 118, extends downwards. In addition, a thread-positioning stage arranged in the area of the bottom return point of the transport belt 120 is provided, which thread-positioning stage is shown in FIG. 12 and is symbolized in FIGS. 10b and 11b by a thread piece F drawn in double lines.

As apparent from FIGS. 11a and 11b, a motor 122 is fastened to the side of the base plate 116 remote from the belts 118 and 120, which are each toothed belts. The motor 122, via a further belt, drives a shaft 123 on which there is mounted on either side of the base plate 116 a roller 119 and 124, respectively. The right-hand roller 119 in FIG. 11b is the driver roller for the transport belt 120, and the left-hand roller 124 drives a toothed belt 125 which, via a roller 126 (FIG. 11a), drives the bottom roller 117 serving as a driver for the guide belt 118. The drive rollers at least are designed as toothed-belt pulleys.

The drive mechanism described ensures that transport and guide belts 120 and 118 respectively are driven at a constant speed ratio. A plurality of belt guides are arranged in the course of the path of the two belts 118 and 120. A guide rail like a bearing surface is designated by reference numeral 127, and a channel-like guide having laterally projecting margins for the guide belt 118 is designated by reference numeral 128. Reference numeral 130 designates a likewise channel-like guide rail for the transport belt 120.

The guide belt 118 is driven clockwise and the transport belt 120 is driven anticlockwise so that the two belts therefore run in the same direction from top to bottom in the area of the guide rails 127 and 130. Flexible transport clamps 131, of which only three are drawn in FIG. 10, are arranged at regular distances along the transport belt 120. The mutual distance between the transport clamps 131 is 130 mm; accordingly, the entire length of the base plate 116 is slightly more than 1 meter. Deflection hooks 132, of which only five are drawn in FIG. 10a, are arranged along the guide belt 118 at half the spacing of the transport clamps 131, that is, at distances of 65 mm. As can be determined by re-measuring, eight transport clamps 131 and deflection hooks 132 always run simultaneously from top to bottom with the transport belt 120 and the guide belt 118 respectively.

When a warp thread is selected, it is clamped just as before the selecting between a top and a bottom clamping rail of the drawing-in frame 5 (FIG. 1) and, in this position, is offered in the area of the top clamping rail to the deflection hooks 132, whose path of movement it crosses. The thread is held in the area of the top clamping rail by a separating device (not shown), is cut and placed with the top end of the bottom part over the deflection hook 132 and is inserted into the open transport clamp 131. This position is shown at the top in FIG. 10a. The transport clamp 131 then closes and clamps the thread in place. At this moment, both belts 118 and 120 are at rest. Transport clamp 131 and deflection hook 132 are then moved downwards, the thread being clamped from the bottom clamping rail of the drawing-in frame 5 (FIG. 1) via the deflection hook 132 to the transport clamp 131. So that the thread now stays clamped during its transport, the transport clamp 131 runs twice as fast as the deflection hook 132, or, in other words, the transport belt 120 is driven twice as fast as the guide belt 118.

As soon as the next deflection hook 132 takes hold of the next selected thread, the operation described is repeated so that eight threads can thus always be transported simultaneously from top to bottom, and in fact in a staggered and intermittent manner. As soon as a transport clamp 131 has arrived in the area of the drive roller 119 at the bottom left in FIG. 10b, which takes place exactly at a moment when the transport belt 120 is at rest, the thread is transferred to the positioning stage shown in FIG. 12, the transport clamp 131 being opened by a pneumatic plunger 133. The drawing-in needle 7 (FIG. 1) then receives the thread.

The thread must definitely be released from its deflection hook 132 the moment it is received by the drawing-in needle 7, since after all the drawing-in takes place at a speed many times greater than the transport by the transport claims 131. After the release by the deflection hook 132, the thread is controlled by the thread-holding device 121. The latter is the continuation of the guide rail 130 and it is designed like a guide channel or guide shaft. The front of this channel facing the viewer is covered by a strip 134 except for a slot. On its inside, this strip is provided with a bristle band 135, whose bristles extend up to a wall 136 laterally terminating the guide channel. Provided at the top end of the guide channel is a bow-like thread guide 137 which guides the thread from the deflection hook 132 into the thread-holding device 121. When it is being drawn out, the thread slides in this thread-holding device 121 between the wall 136 and the bristles bearing against this wall 136, both of which together act as a thread brake. Consequently, the thread is also always clamped in this phase and never gets out of control. A window-like recess 144 for monitoring thread movement by a sensor is provided in the area of the bottom end of the wall 136.

FIG. 12 shows a view of the position stage in which the thread is positioned for being received by the drawing-in needle 7 (FIG. 1). The figure is an enlarged detail of FIG. 11, the pneumatic plunger 133 for opening the transport clamps 131 being omitted for the sake of clarity. The bottom end of the base plate 116 and the shaft 123 having the rollers 124 and 119 will be recognized in the figure. Shown at the periphery of the roller 119 is a clamping element 131' which fastens the transport clamps 131 (FIG. 10a) to the transport belt 120.

A first support plate 139 is held at a distance from the base plate 116 via first distance pins 138, on which first support plate 139 a second support plate 141 is mounted via second distance pins 140. In addition, the first support plate 139 serves as a top for a first pneumatic clamping plunger 142 which is mounted in the base plate 116 and whose end face, in the inoperative state, lies at the level of the right-hand end face of the roller 119 and which, when it is activated, is moved to the right towards the first support plate 139 until it bears against the latter in its active position shown. Mounted in the second support plate 141 is a second pneumatic clamping plunger 143 which, when it is activated, is moved out of its inoperative position shown to the left towards the roller 119 and comes against the stop at the adjacent end face of the latter.

As a comparison of FIGS. 11b and 12 shows, the thread in the position F, in which it is offered to the position stage, is inclined at a relatively slight angle and is then moved by the clamping plungers 142 and 143 into the receiving position F' drawn in FIG. 12, in which it is moved in the path of the schematically drawn drawing-in needle 7 and is taken hold of by its hook-shaped jaw and clamped in place in the latter.

As already mentioned, both the opening of the transport clamps 131 for releasing the thread and its closing during receiving of the thread are effected when the transport belt 120 is at rest. During the drawing-in by the drawing-in needle 7, the next transport clamp 131 reaches the pneumatic plunger 133 and a next thread is received, and so on. Since eight threads pass through the presenting apparatus PS simultaneously, eight times the drawing-in duration is available for this for one thread, so that reliable thread presentation is ensured even at high drawing-in frequency.

Figure 14:
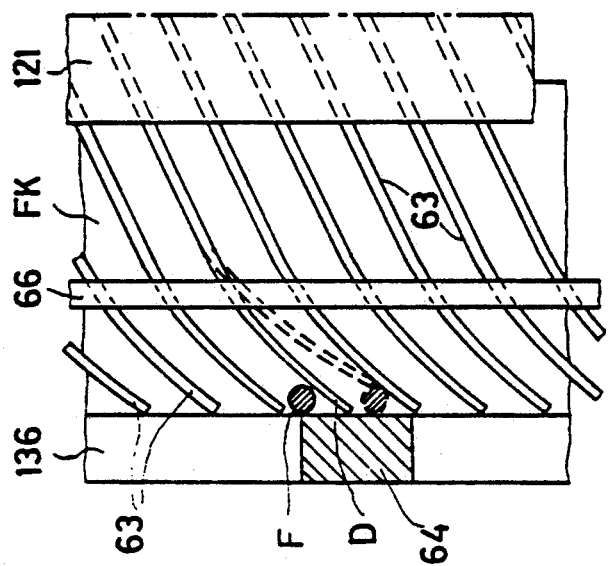
FIG. 14 shows a detail of FIG. 13 to a scale of 3:1.
Figure 13:
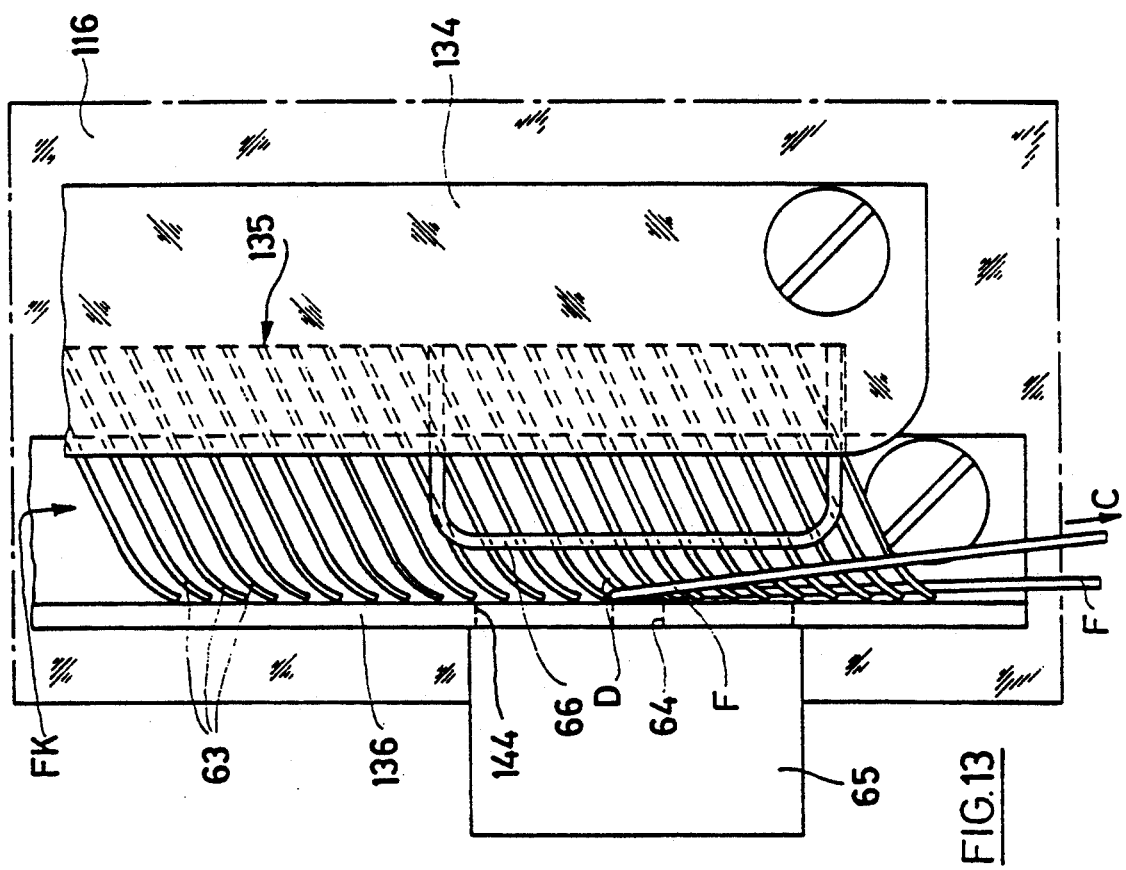
FIG. 13 shows a detail of FIG. 10$b$ to a scale of 1.5:1.

FIG. 13 shows a detail of the thread-holding device 121 from FIG. 10b to a scale of 1.5:1 and FIG. 14 shows a detail from FIG. 13 to a scale of 3:1. As already mentioned, the thread-holding device serves to release in a controlled manner a thread piece F, present in the form of a loop, when a force pulling the thread out of the thread holding device acts. It comprises an elongated conveying channel FK which contains the thread loop and thus performs the function of a thread storage means. The loop is fixed outside the conveying channel FK at one leg in a stationary clamp and at its other leg, that is, in the area of the free thread end, in a transport clamp 132 (FIG. 10a) which pulls the thread F out of the conveying channel FK in the direction of arrow C. So that this pulling-out of the thread F can be effected in a controlled manner and the thread loop is retained to the very end, brake elements acting on the knee of the loop are provided in the conveying channel FK, which brake elements keep the thread taut.

The thread-holding device essentially consists of the conveying channel FK already mentioned, which is formed by the two L-shaped rails 136 and 134 which are mounted on the base plate 116 (FIG. 10b) and enclose the shaft-like conveying channel FK. On the side remote from the base plate 116, a continuous slot is formed between the two rails 136 and 134, which slot is covered by elastic bristles 63 made of a suitable material, for example steel or a plastic such as nylon. The bristles 63 are preferably embedded in a carrying band 135 which is adhesively bonded into a corresponding step on the inside of the right-hand rail 134 in FIG. 13 and they are longer than the width of the slot at their part overlapping the slot. With their free head part, the bristles butt against the left-hand rail 136, designated below as stop rail, and are bent over on the latter. This means that the bristles 63, with their head part, press flexibly against the stop rail 136.

Towards the discharge end of the conveying channel FK, the stop rail 136 has a window-like aperture 144 (FIG. 11b) into which a housing 65 comprising a piezoelectric sensor 64 and its wiring is inserted.

The mode of operation of the piezoelectric sensor is as follows: the thread loop F located in the conveying channel FK is held by a bristle 63 at its knee, where the two legs of the loop meet, and jumps from one bristle to the next when being drawn out of the conveying channel FK, in the course of which the bristle 63 just holding the loop is pressed away downwards and as a result is additionally tensioned and, after passing the thread F, springs back into its initial position.

This situation is shown in FIG. 14, and in fact at the moment at which the thread F or, more precisely, the knee of the thread loop just reaches the piezoelectric sensor 64. The very next moment, the thread F strikes a bristle, designated by D, which, when the thread passes, is pivoted from the position drawn in solid lines into the position drawn in dotted lines (dotted position of thread). As soon as the thread has passed the bristle D, the latter pivots back out of its dotted position into the rest position and as a result strikes against piezoelectric sensor 64. This pressure impulse is detected by the sensor 64 and is interpreted in the signal processing means as a signal for the passage of a thread. Since the sensor 64, is arranged near the discharge opening of the thread loop from the conveying channel FK, that is, at a location where the thread loop is already very short and therefore the thread is already for the most part drawn into the harness, the signal from the sensor 64 is evaluated as confirmation of the completed drawing-in of the thread.

In order to ensure that the bristle D forming part of the thread monitor strikes the piezoelectric sensor 64 when pivoting back into the rest position and does not strike against the stop rail 136 next to this piezoelectric sensor 64, the bristles 63 are guided in the area of the sensor 64 between two stirrups 66 which are arranged on either side of the bristle group and prevent the bristles from giving way laterally.

Practical testing has shown that the described thread monitor functions absolutely reliably despite its simple construction. Particularly good results were obtained with the following specifications:

bristle material: spring steel
bristle thickness: 0.3 mm
overlength of the bristles compared with the gap width: 2 mm.

Figure 15:
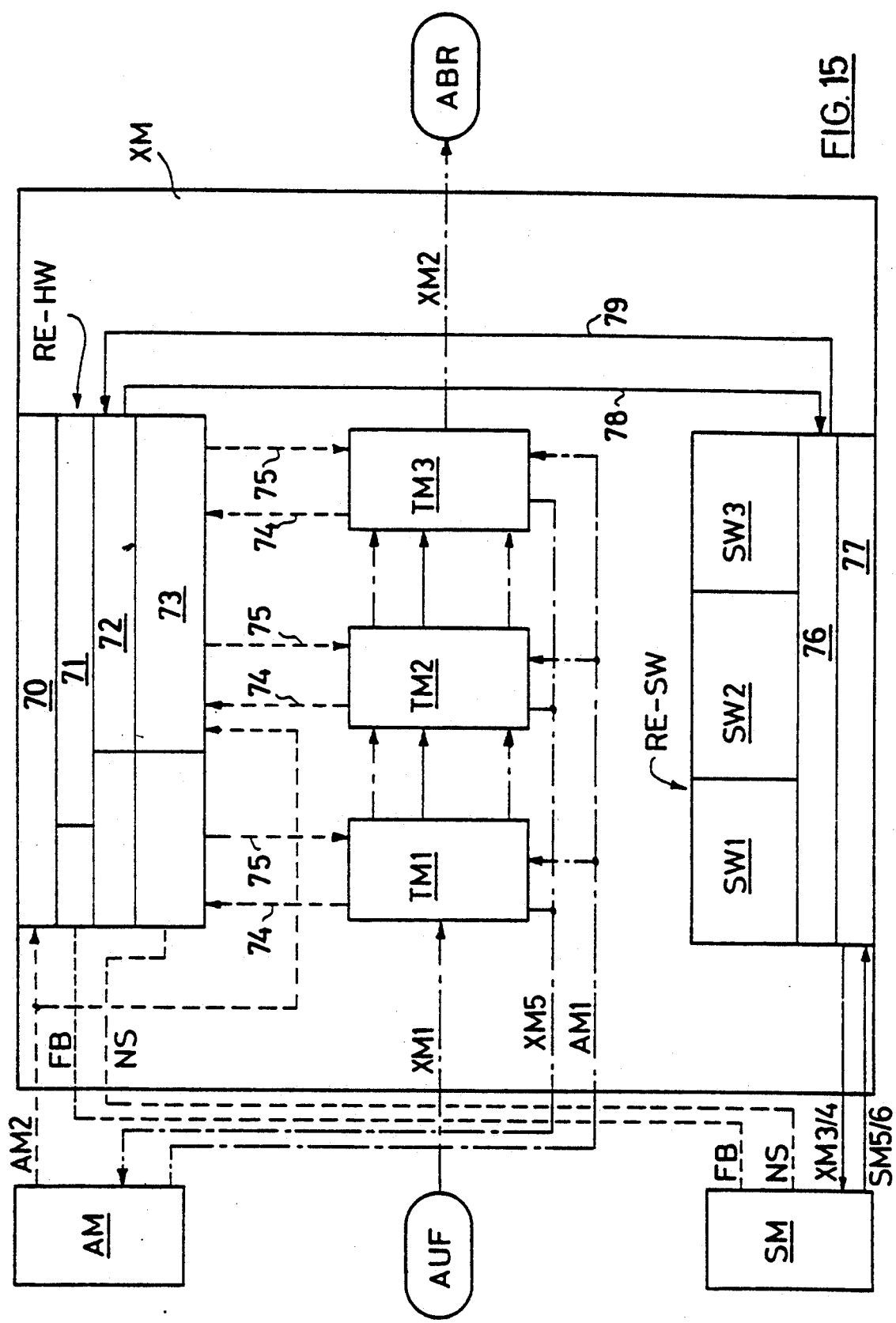
FIG. 15 shows a detail of FIG. 2.

FIG. 15 shows schematically a working module XM (FIG. 2). By analogy with FIG. 2, the set-up and the take-down interfaces AUF and ABR respectively and the overall system module AM as well as the control module SM and the individual connections to these interfaces or modules can be recognized. The working module shown has three (generally: n) submodules TM1 to TM3 for performing the respective functions. The first submodule TM1 is loaded with harness elements or yarn (XM1), and the last submodule TM3 delivers the drawn-in harness (XM2) to the take-down interface ABR. All submodules are mechanically fastened (XM5) and are supplied with processed air (AM1). An internal material flow and a transfer detection take place between the individual submodules and there are internal fastenings, which is indicated by the connections between the submodules TM1 and TM2 and respectively TM2 and TM3.

As already mentioned, each working module XM contains a module computer. In FIG. 15, this is split up into two parts, namely into a hardware part RE-HW and into it software part RE-SW, the latter having a block SW1, SW2 and SW3 for each submodule TM1 to TM3. The hardware part RE-HW, whose feed is designated by 70, consists of a microprocessor card 71, input-output cards 18, a driver/adaptation stage 73 and the field bus AT. The hardware part RE-HW is supplied with processed electricity (AM2) and, via lines 74, receives signals from sensors of the individual submodules, processes these signals and transmits corresponding control signals to the submodules via lines 75.

Apart from the blocks SW1, SW2 and SW3 allocated to the submodules, the software part RE-SW also contains a hardware stage 76 and a communication stage 77. The hardware stage 76 is connected to the input/output cards 72 of the hardware part RE-HW via a control-signal and a sensor-signal line 78 and 79 respectively. The communication stage 77 delivers module-status and module-enquiry data (XM3/4) to the control module SM and receives from the latter module input data and module commands (SM5/6).

All working modules are constructed in the way described and are therefore interchangeable. They can be adapted to future market requirements, i.e. developed and modified. Each module is an autonomous functional unit and the intelligence of the system is arranged decentrally. The system configuration can be largely adapted to customers' needs. The module autonomy permits increased redundancy of individual functions and enables the modules or functional units to be activated individually. The individual functions depend on one another only to a very small degree and faults are very simple to localize.

FIG. 15 shows a chart of the data flow of the drawing-in machine whereby for better clearness a presentation different from that of FIG. 2 and 15 has been chosen. From this it appears that no direct data cross-connections exist between the individual modules but that these cross-connections between the modules run via the higher-level computer.

Monitoring is performed by the sensors for the actuating members of the submodules which report an appropriate signal SE (FIG. 16) back to the module computer RE of the respective working module. The module computer processes the sensor signals SE and delivers module informations MI to the control module SM which processes the data received from the modules to drawing-in informations EI which are displayed on the screen 8 (FIG. 1).

Figure 16:
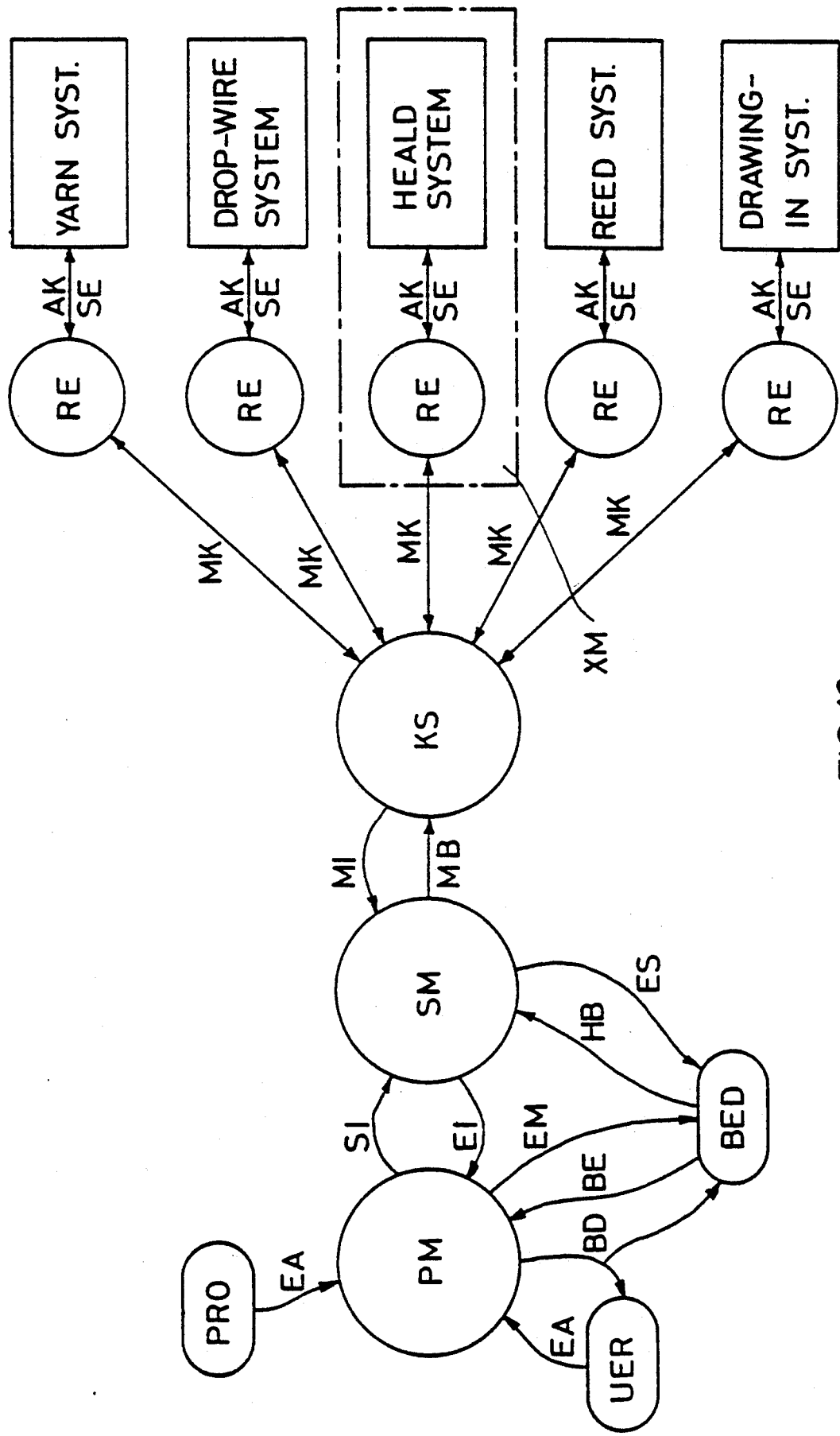
FIG. 16 is a flow chart.

In the left half of FIG. 15, the programming module PM and the control module SM are drawn in, the latter of which comprises, as already mentioned, the higher-level computer. Associated with the two modules PM and SM are the programming interface PRO, the host UER and the operating interface BED. KS signifies a communication stage which is part of the control module SM and is formed by a data bus system essentially. Data lines MK for the module communication lead from the communication stage KS to the individual modules. These are presented as two-stage modules whereby "system" designates the mechanical part of each module which corresponds to the submodules TM of FIG. 15 and whereby RE designates the respective module computer. Both stages together are in accordance with an operative module XM (FIG. 15) as indicated in FIG. 16 at the heald module.

The data flow from the programming module PM and from the interfaces connected with it to the operative modules proceeds as follows: The programming module PM receives from the programming interface PRO and from the host UER drawing-in instructions EA and from the operating interface BED operating impulses BE and delivers to the control module SM adequate control information S1. The control module SM which receives from the operating interface BED moreover possible hand-box instructions HB processes the data supplied to it to module instructions MB which come via communication stage KS over the data lines MS to the corresponding module computer RE. The module computers RE deliver the received module instructions in the form of control signals AK to the respective actuating member of the submodule.

Usually the function of every actuating member of the submodule is supervised by a sensor which reports an appropriate signal SE back to the module computer RE. FIG. 4 shows sensors 25 which supervise the heald acceptance at the heald distribution submodule HD. The module for the separation of the healds has also a sensor for monitoring the separation. If a delay occurs at this stage, the control or higher-level computer receives a signal from the respective module computer RE and delivers a signal to the module computer of the drawing-in module which keeps the drawing-in needle 7 (FIG. 3) back until all harness elements have reached their correct drawing-in position. Just as autonomous is the behavior of the module for the handling of the warp sheet. It an attempt to separate a thread is unsuccessful, the module will independently carry out a number of repeat attempts.

When a sensor 25 (FIG. 4) indicates that a heald had not been transferred to the heald distribution submodule HD within a given time interval after the separation signal of the separation sensor, the control computer produces an alarm signal which stops the machine and monitors the failure. In this case the machine cannot carry out a number of repeat attempts as a heald has gone lost between separation and submodule HD. This heald must be somewhere within this area of the machine and any repeat could lead to mechanical damages of the machine. Therefore, the said heald has to be looked for and removed from the machine by hand.

A third type of sensor signals are the signals of sensors which supervise whether the heald and drop-wire magazines contain enough healds and drop-wires respectively (see for example the sensors of the submodule drop-wire storing which are described in U.S. application Ser. No. 07/702,020). When a sensor of this type delivers a signal "no more drop-wires", this signal is considered as a warning which does not stop the machine immediately. The sensors are so arranged that the first warning signal will be produced when a given number (for example 100) of harness elements is still in the magazine. This produces a display "fill up drop-wires" for the operator and starts in the control computer a counting of the warning signals. When the drop-wires are filled up within a number of 100 warning signals these signals will expire and the machine will continue its operation. Only when the alarm signals do not expire within the said interval will the control computer stop the machine.

The module computer RE for its part communicates with the control module SM via data line MK and communication stage KS which accordingly delivers module information MI to the control module SM. The control module processes the data received from the modules to drawing-in information EI for the programming module PM and moreover supplies information ES about the drawing-in status to the operating interface BED. The programming module PM finally supplies to the operating interface BED drawing-in reports EM and to the operating interface BED and the host UER working data BD.

It is evident from this data flow chart that no direct data cross-connections exist between the individual module computers but that in both directions the total data flow runs exclusively via the higher-lever computer which is comprised in the control module.

What is claimed is:

1. System for automatically drawing-in warp threads supplied from a warp beam into elements of a weaving harness, comprising:

a yarn module including thread manipulating means for sequentially separating individual warp thread end portions from a group of such end portions from the warp beam and positioning a separated end portion for a drawing-in operation, means for sensing a separated warp thread end portion, and thread controller means responsive to said sensing means for controlling such thread manipulating means and developing output signals;

a heald module including heald manipulating means for sequentially separating individual healds from a supply of healds and positioning a separated heald so that a separated warp thread can be drawn-in through an opening in the separated heald, heald sensing means for sensing a separated heald and held controller means responsive to said sensing means for controlling said heald manipulating means and developing output signals;

a draw-in module including a drawing-in member movable back and forth along a path for engaging a separated warp thread positioned for drawing in and for pulling the separated warp thread through an opening in said separated heald and then releasing said separated warp thread, signal generating means for generating signals during operation of said drawing-in member, and draw-in controller means for controlling movements of said drawing-in member; and a control module electrically connected to each of said controller means for communicating individually with each of said controller means to receive output signals from each of said controller means and to instruct each of said controller means to operate its respective module, said control module being responsive to an indication from each of said controller means that the corresponding separated warp thread and separated heald have been properly aligned to instruct said drawing-in member to engage the separated warp thread and draw it through the opening in the aligned heald.

2. System for automatically drawing-in warp threads according to claim 1, additionally separating individual drop wires from a supply of drop wires and positioning a separated drop wire for a drawing-in operation, and drop wire controller means for controlling such drop wire manipulating means to cause said drop wire manipulating means to carry out its operations.

3. System for automatically drawing-in warp threads according to claim 1, additionally including a reed module including reed manipulating means for sequentially positioning a reed to align successive gaps between reed dents with respect to a heald positioned for a drawing-in operation, and reed controller means for controlling such reed manipulating means to cause said reed manipulating means to carry out its operations.

4. System for automatically drawing-in warp threads according to claim 1, wherein said thread controller means includes a yarn module computer, wherein said thread manipulating means in said yarn module includes a plurality of sub-modules connected with said yarn module computer to report sensor signals to and receive control signals from such yarn module computer, and wherein said yarn module computer is connected with said control module.

5. System for automatically drawing-in warp threads according to claim 4, wherein said plurality of sub-modules included in said thread manipulating means comprises a sub-module for presenting a layer of warp threads to be drawn-in, a sub-module for sequentially separating the individual warp thread end portions from said layer, and a sub-module for positioning the separated warp thread end portions for the drawing-in operation.

6. System for automatically drawing-in warp threads according to claim 1 wherein said heald controller means includes a heald module computer, wherein said heald manipulating means in said heald module includes a plurality of sub-modules connected with said heald module computer to report sensor signals to and receive control signals from such heald module computer, and wherein said heald module computer is connected with said control module.

7. System for automatically drawing-in warp threads according to claim 6, wherein said plurality of sub-modules included in said heals manipulating means comprises a sub-module for storing heald stacks; a submodule for separating individual healds from a stack; and a sub-module for transporting the separated healds to the drawing-in position and for transporting the healds with threads drawn therein away from said drawing-in position.

8. System for automatically drawing-in warp threads according to claim 2, wherein said drop wire controller means includes a drop wire module computer, wherein said drop wire manipulating means in said drop wire module includes a plurality of sub-modules connected with said drop wire module computer to report sensor signals to and receive control signals from such drop wire module computer, and wherein said heald module computer is connected with said control module.

9. System for automatically drawing-in warp threads according to claim 8, wherein said plurality of sub-modules included in said drop wire manipulating means comprises a sub-module for storing drop wire stacks; a sub-module for separating individual drop wires form the stack; and a sub-module for transporting the separated drop wires to the drawing-in position and for transporting the drop wires and threads drawn therein away from said drawing-in position.

10. System for automatically drawing-in warp threads supplied from a warp beam into elements of a weaving harness, comprising:
 a yarn module including thread manipulating means for sequentially separating individual warp thread end portions from a group of such end portions from the warp beam and positioning a separated end portion for drawing-in operation, means for sensing a separated warp thread end portion, and thread controller means responsive to said sensing means for controlling such thread manipulating means and developing output signals;
 a heald module including heald manipulating means for sequentially separating individual healds from a supply of healds and positioning a separated heald for a drawing-in operation in which a separated warp thread is drawn-in through an opening in the separated heald, heald sensing means for sensing a separated heald and heald controller means responsive to said sensing means for controlling said heald manipulating means and developing output signals;
 a draw-in module including a drawing-in member movable back and forth along a path for engaging a separated warp thread positioned for drawing-in and for pulling said separated warp thread through an opening in said separated heald and then releasing said separated warp thread, drawing-in member sensing means for sensing the movement of said movable drawing-in member, and draw-in controller means responsive to said sensing means for controlling said drawing-in member and generating output signals; and
 a control module electrically connected to each of said controller means for communicating individually with each of said controller means to receive output signals from each controller means and to instruct each controller means to operate its respective module.

11. System for automatically drawing-in warp threads according to claim 10, additionally including a drop wire module including drop wire manipulating means for sequentially separating individual drop wires from as supply of drop wires and positioning a separated drop wire for a drawing-in operation, and drop wire controller means for controlling operation of said drop wire manipulating means.

12. System for automatically drawing-in warp threads according to claim 10, additionally including a reed module including reed manipulating means for sequentially positioning a reed to align successive gaps between reed dents with respect to a heald positioned for a drawing-in operation, and reed controller means for controlling operation of said reed manipulating means.

* * * * *